United States Patent
Fox et al.

(10) Patent No.: US 11,305,224 B2
(45) Date of Patent: Apr. 19, 2022

(54) AIR FILTER MEDIA WITH POST-PLEAT-DEPOSITED SORBENT PARTICLES

(71) Applicant: 3M INNOVATIVE PROPERTIES COMPANY, St. Paul, MN (US)

(72) Inventors: Andrew R. Fox, Oakdale, MN (US); Himanshu Jasuja, St. Paul, MN (US); Mikhail A. Belkin, Minneapolis, MN (US); Bryan L. Gerhardt, Woodbury, MN (US); Glen O. Gregerson, Hudson, WI (US); Gerry A. Hoffdahl, Scandia, MN (US); Jonathan M. Lise, Woodbury, MN (US); Tien T. Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 132 days.

(21) Appl. No.: 16/606,596

(22) PCT Filed: Apr. 18, 2017

(86) PCT No.: PCT/CN2017/080905
§ 371 (c)(1),
(2) Date: Oct. 18, 2019

(87) PCT Pub. No.: WO2018/191865
PCT Pub. Date: Oct. 25, 2018

(65) Prior Publication Data
US 2020/0129907 A1 Apr. 30, 2020

(51) Int. Cl.
*B01D 46/00* (2022.01)
*B01D 46/52* (2006.01)

(52) U.S. Cl.
CPC ..... *B01D 46/0036* (2013.01); *B01D 46/0001* (2013.01); *B01D 46/522* (2013.01);
(Continued)

(58) Field of Classification Search
CPC ............ B01D 46/0036; B01D 46/0001; B01D 46/522; B01D 46/523; B01D 2265/04; B01D 2279/50
(Continued)

(56) References Cited

U.S. PATENT DOCUMENTS

| RE30,782 E | 10/1981 | van Turnhout |
|---|---|---|
| 4,813,948 A | 3/1989 | Insley |

(Continued)

FOREIGN PATENT DOCUMENTS

| CN | 102387849 | 3/2012 |
|---|---|---|
| CN | 106211760 | 12/2016 |

(Continued)

OTHER PUBLICATIONS

International Search report for PCT International Application No. PCT/CN2017/080905 dated Jan. 19, 2018, 5 pages.

*Primary Examiner* — T. Bennett McKenzie
*Assistant Examiner* — Qianping He
(74) *Attorney, Agent, or Firm* — Kenneth B. Wood

(57) ABSTRACT

An air filter media (10) including a pleated fibrous filtration web (8) with a first major side (2) that includes at least one sorbent-loaded area (26) in which sorbent particles (14) are present on a first major surface (25) of the pleated fibrous filtration web (8), at least some of the sorbent particles (14) being post-pleat-deposited sorbent particles.

12 Claims, 7 Drawing Sheets

(52) U.S. Cl.
CPC ........ B01D 46/523 (2013.01); *B01D 2265/04* (2013.01); *B01D 2279/50* (2013.01)

(58) Field of Classification Search
USPC ................. 96/135; 502/402; 210/506, 502.1; 264/122; 55/524
See application file for complete search history.

(56) References Cited

U.S. PATENT DOCUMENTS

| | | | |
|---|---|---|---|
| 4,976,677 | A | 12/1990 | Siversson |
| 5,124,177 | A | 6/1992 | Kasmark, Jr. |
| 5,230,800 | A | 7/1993 | Nelson |
| 5,256,231 | A | 10/1993 | Gorman |
| 5,332,426 | A | 7/1994 | Tang |
| 5,389,175 | A | 2/1995 | Wenz |
| 5,616,169 | A | 4/1997 | De Ruiter |
| 5,620,545 | A | 4/1997 | Braun |
| 5,779,847 | A | 7/1998 | Groeger |
| 6,024,782 | A | 2/2000 | Freund |
| 6,233,790 | B1* | 5/2001 | Carothers .............. B01D 29/21 24/16 PB |
| 6,423,123 | B1 | 7/2002 | Rosenberg |
| 6,726,751 | B2 | 4/2004 | Bause |
| 6,840,986 | B1 | 1/2005 | Koslow |
| 7,052,533 | B2 | 5/2006 | Nakahara |
| 7,947,142 | B2 | 5/2011 | Fox |
| 8,142,538 | B2 | 3/2012 | Sundet |
| 8,162,153 | B2 | 4/2012 | Fox |
| 8,368,736 | B2 | 2/2013 | Saisho |
| 8,506,669 | B2 | 8/2013 | Fox |
| 8,894,466 | B2 | 11/2014 | Jungbauer |
| 8,968,445 | B2 | 3/2015 | Lindahl |
| 9,174,159 | B2 | 11/2015 | Sanocki |
| 9,539,532 | B2 | 1/2017 | Fox |
| 10,265,653 | B2 | 4/2019 | Fox |
| 2003/0041733 | A1 | 3/2003 | Seguin |
| 2003/0089091 | A1* | 5/2003 | Sundet ................. B01D 46/523 55/499 |
| 2003/0089092 | A1 | 5/2003 | Bause |
| 2004/0011204 | A1 | 1/2004 | Both |
| 2004/0134355 | A1* | 7/2004 | Kasmark, Jr. ...... B01D 39/2055 96/154 |
| 2004/0163540 | A1 | 8/2004 | Mori |
| 2006/0032371 | A1 | 2/2006 | Dauber |
| 2006/0278087 | A1* | 12/2006 | Sepke ................... B01D 15/327 210/635 |
| 2008/0038976 | A1 | 2/2008 | Berrigan |
| 2010/0162895 | A1* | 7/2010 | Bohringer .......... B01D 39/2065 96/134 |
| 2011/0083686 | A1* | 4/2011 | Yang ........................ A24D 3/04 131/328 |
| 2011/0290119 | A1 | 12/2011 | Ylitalo |
| 2012/0272829 | A1 | 11/2012 | Fox |
| 2013/0101477 | A1 | 4/2013 | Both |
| 2014/0144112 | A1* | 5/2014 | Campbell ............ B01D 46/523 55/482 |
| 2014/0235419 | A1 | 8/2014 | Lise |
| 2015/0047508 | A1* | 2/2015 | Sanocki ............. B01D 46/0001 96/74 |
| 2016/0185858 | A1 | 6/2016 | Smith |
| 2017/0106434 | A1 | 4/2017 | Wang |
| 2017/0160650 | A1 | 6/2017 | Loopstra |
| 2017/0213926 | A1 | 7/2017 | Gaume |
| 2018/0057465 | A1 | 3/2018 | Lessene |

FOREIGN PATENT DOCUMENTS

| | | | |
|---|---|---|---|
| EP | 0800863 | 12/2002 | |
| JP | 55139814 | 11/1980 | |
| JP | S55139814 | 11/1980 | |
| JP | S6073839 | 4/1985 | |
| JP | H 11165008 | 6/1999 | |
| JP | 11226338 | 8/1999 | |
| JP | H 11254958 | 9/1999 | |
| JP | 05007725 | 6/2012 | |
| WO | WO 2001-041901 | 6/2001 | |
| WO | WO 2003-009933 | 2/2003 | |
| WO | WO 2003-015914 | 2/2003 | |
| WO | WO 2014-092718 | 6/2014 | |
| WO | WO-2014092718 A1 * | 6/2014 | ............ B01D 46/10 |
| WO | WO 2017-066284 | 4/2017 | |
| WO | WO 2017-160650 | 9/2017 | |
| WO | WO 2018-039231 | 3/2018 | |
| WO | WO 2018-090279 | 5/2018 | |
| WO | WO 2018-090280 | 5/2018 | |
| ZA | 9708668 | 3/1998 | |

* cited by examiner

AIR FILTER MEDIA WITH POST-PLEAT-DEPOSITED SORBENT PARTICLES

BACKGROUND

Pleated filters are commonly used in air filtration applications, e. g. in heating-ventilating-air conditioning (HVAC) systems, room air purifiers, and so on.

SUMMARY

Herein is disclosed an air filter media comprising a pleated fibrous filtration web with a first major side that includes at least one sorbent-loaded area in which sorbent particles are present on a first major surface of the pleated fibrous filtration web, wherein at least some of the sorbent particles are post-pleat-deposited sorbent particles. Also disclosed are air filters that use such air filter media, and methods of making such air filter media and filters. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DEFINITIONS

Although terms such as "top", bottom", "upper", lower", "under", "over", "front", "back", "up" and "down", and "first" and "second" may be used in this disclosure, it should be understood that those terms are used in their relative sense only unless otherwise noted. In particular, the term "first major side" is used to designate a side of a filter media that comprises sorbent particles; the term "second side" is used to denote the opposite-facing side of the filter media. These designations are used purely for convenience of description. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter. In regard to process steps, terms such as "before", "after", "prior to", "followed by", "subsequent", "in order", and the like, do not preclude the presence of intervening steps as long as the specified order is maintained.

The term "post-pleat-deposited" denotes items (e.g. sorbent particles and/or adhesive parcels) that are deposited onto a substrate (e.g. a fibrous filtration web) subsequent to the substrate having been folded into a pleated configuration, as described in detail herein.

DETAILED DESCRIPTION

Figure 1:
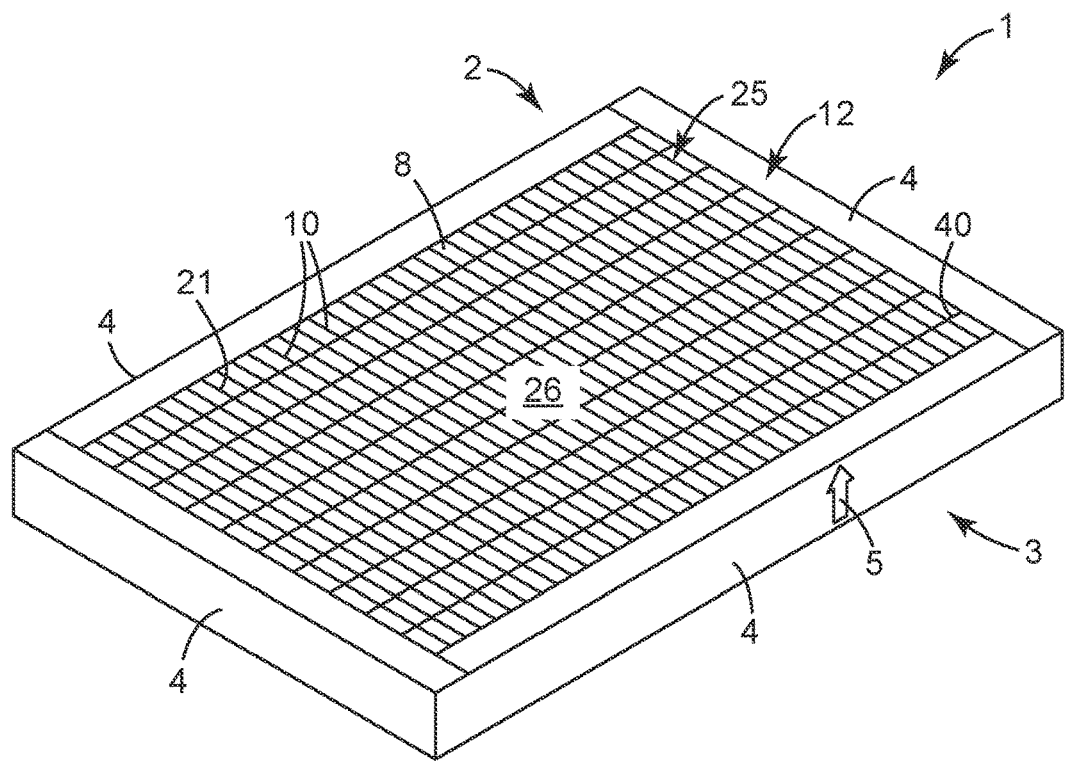
FIG. 1 is a perspective view of an exemplary air filter, viewed from a first major side.
Figure 2:
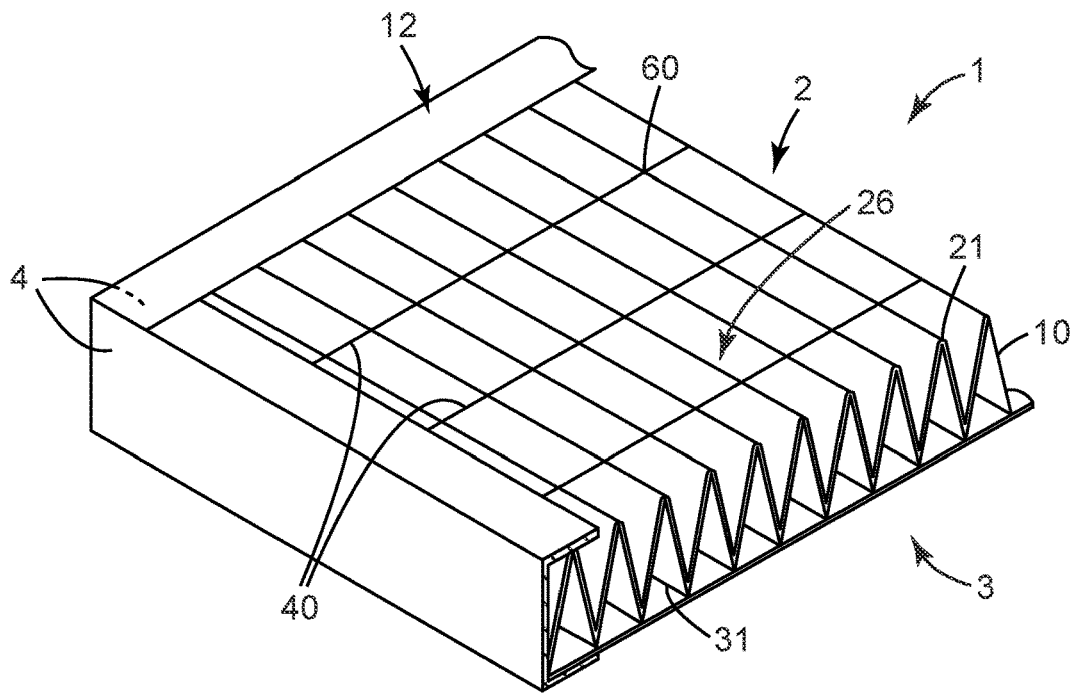
FIG. 2 is a partial cutaway perspective view of the exemplary air filter of FIG. 1.

Shown in FIGS. 1 and 2 in perspective view from a first major side is an exemplary air filter 1 comprising an air filter media 10 that includes a pleated fibrous filtration web 8. In many embodiments, air filter media 10, and pleated fibrous filtration web 8 thereof, may be rectangular in shape (which specifically includes square shapes) with filter media 10 thus having a generally rectangular perimeter (which does not preclude irregularities, notches, chamfered or angled corners, or the like, in the perimeter of filter media 10). Air filter media 10 and pleated fibrous filtration web 8 thereof thus often have four major edges 4 as shown in exemplary embodiment in FIG. 1. In some embodiments air filter 1 may comprise a perimeter support frame 12 that is mounted on major edges 4 of filter media 10, as in the exemplary embodiment of FIGS. 1 and 2. In other embodiments, air filter 1 may not comprise a perimeter support frame (and may thus exhibit an appearance similar to the exemplary embodiments depicted in FIGS. 3 and 4). Pleated fibrous filtration web 8 (as described in detail later herein) comprises a first major side 2 with a first major surface 25, and a second, oppositely-facing major side 3 with a second major surface 35. First major side 2 of pleated fibrous filtration web 8 comprises at least one sorbent-loaded area 26 in which sorbent particles 14 are present on first major surface 25 of pleated fibrous filtration web 8.

Pleats

Figure 3:
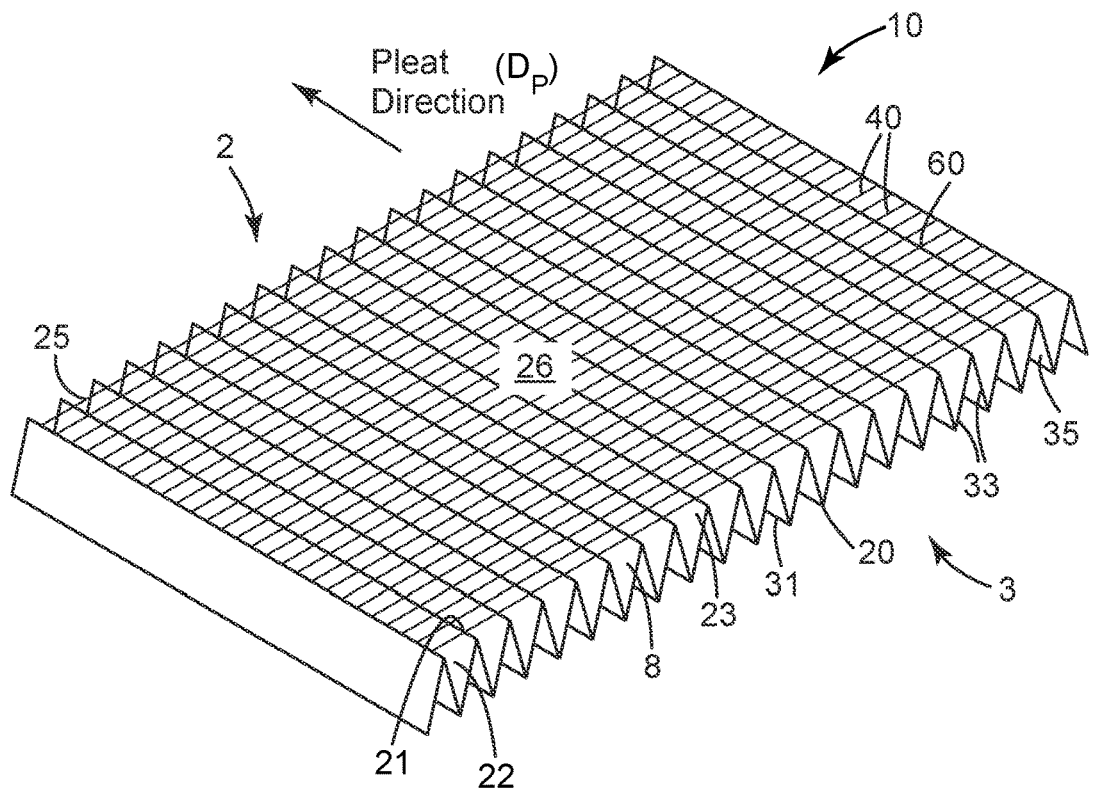
FIG. 3 is a perspective view of an exemplary air filter media comprising a pleated fibrous filtration web.
Figure 4:
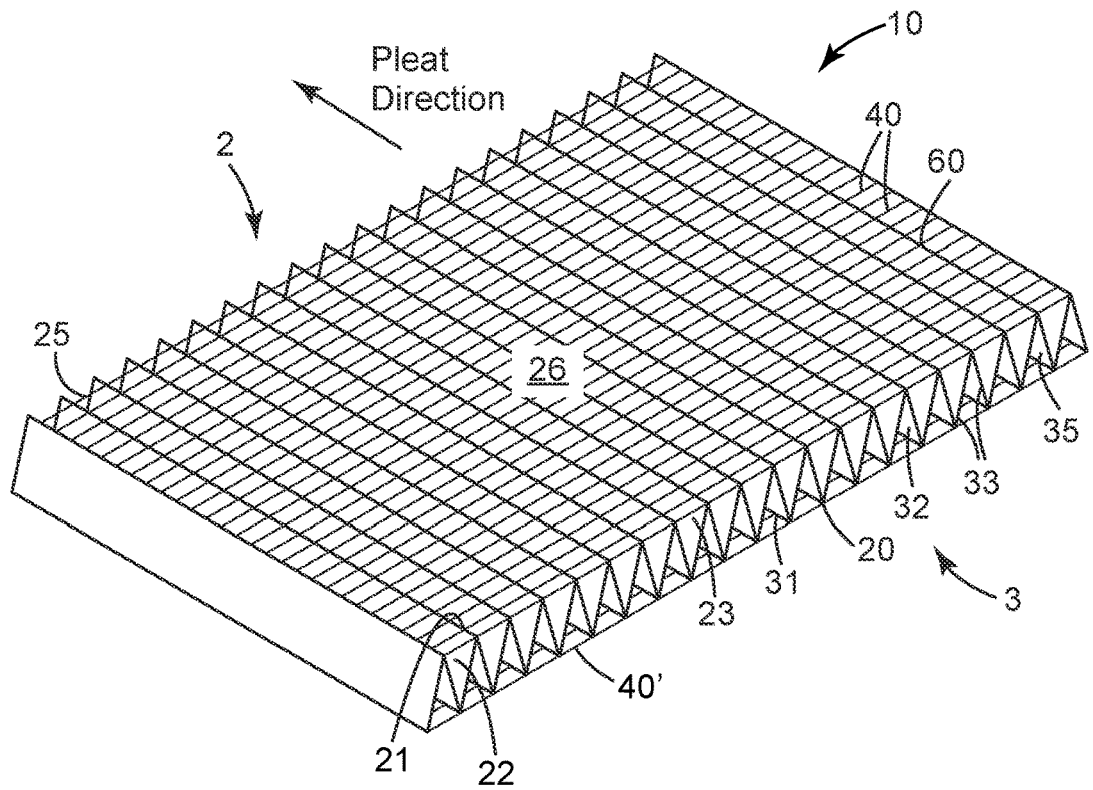
FIG. 4 is a perspective view of another exemplary air filter media comprising a pleated fibrous filtration web.
Figure 5:
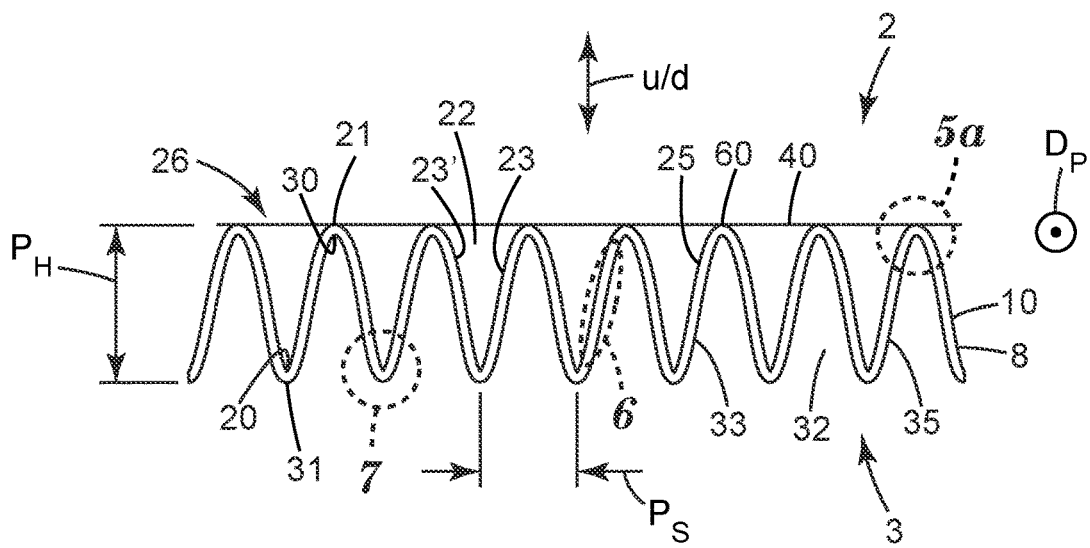
FIG. 5 is a side schematic cross sectional view of a portion of an exemplary air filter media comprising a pleated fibrous filtration web.

As shown in further detail in FIG. 3, pleated fibrous filtration web 8 comprises rows of parallel, oppositely-folded pleats that exhibit a clearly identifiable pleat direction $D_p$ as indicated in FIGS. 3-5. As viewed from the first major side 2 of the filter media (as in FIGS. 1-4), pleated fibrous web 8 exhibits a plurality of first-side pleat walls 23 and first-side pleat tips 21. As depicted in FIG. 5, which is a side view taken along the pleat direction $D_p$, pairs of co-facing first-side pleat walls 23 (e.g., pleat walls 23 and 23' as denoted in FIG. 5) define valleys (e.g. air-filled spaces) 22 therebetween with valley "floors" 20 defining the terminus (the deepest extent) of valleys 22. Similarly, when viewed from second major side 3, pleated fibrous web 8 will exhibit a plurality of second-side pleat walls 33, second-side pleat tips 31, second-side valleys 32, and second-side valley floors 30.

Details of pleat geometry are discussed with reference to the side view of filter media 10 comprising pleated fibrous web 8 in FIG. 5. The pleat height (pleat amplitude) is the distance ($P_h$ in FIG. 5) from first-side tip 21 to second-side tip 31, along a direction that is orthogonal to the overall major plane of filter media 10. Such a direction will typically correspond to the overall direction of airflow through the filter; that is, the direction marked u/d (upstream/downstream) in FIG. 5. In various embodiments, the pleat height of pleated fibrous web 8 can be at least about 4, 6, 8, 10, 12, 14, 16, 18, 20, 30, or 40 mm. In further embodiments, the pleat height may be at most about 100, 70, 42, 32, 22, 20, 15, 12, 10, or 8 mm.

The pleat spacing ($P_s$ in FIG. 5) is the distance between nearest-neighbor same-side pleat tips, along a direction that is in the overall major plane of filter media 10. In various embodiments the pleat spacing may be at most about 30, 20, 16, 12, 10, 8, 6 or 4 mm. In further embodiments the pleat spacing may be at least about 3, 5, 7, 9 or 11 mm.

Figure 5A:
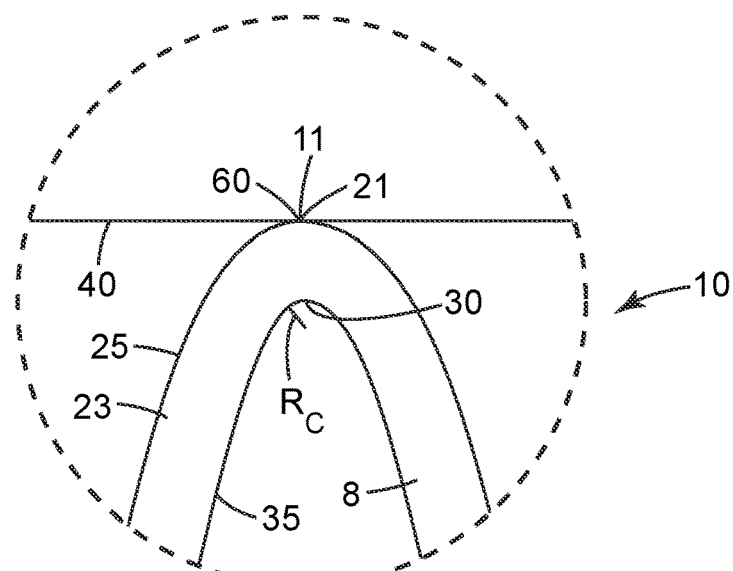
FIG. 5a is a magnified isolated cross-sectional view of a first-side pleat tip of the exemplary air filter media of FIG. 5.

The radius of curvature ($R_c$) of folds (creases) of a pleated fibrous web 8 can be evaluated as shown in the magnified view of a representative fold (which fold comprises a first-side pleat tip 21 and a second-side pleat valley floor 30) in FIG. 5a. The radius of curvature of such a fold will be measured along the inward (concave) surface of fibrous web 8, that is, along the pleat valley floor (e.g. valley floor 30 of FIG. 5a). In various embodiments, the radius of curvature of such folds may be at most about 5, 4, 3, 2, 1.8, 1.6, 1.4, 1.2, 1.0, 0.8, or 0.6 mm. In further embodiments the radius of curvature of such folds may be at least about 0.5, 0.7, 0.9, 1.1, 1.3, 1.5, or 1.7 mm. It will be appreciated that the herein-listed radii of curvature, pleat heights, pleat spacings, etc., will be average values and that individual pleats may sometimes deviate considerably from such average values, due to e.g. statistical fluctuations in the pleating process.

It will be understood that by pleated, a pleated configuration, a pleated web, and similar terms, is meant a configuration in which a substrate (e.g. a fibrous filtration web 8) is stably held in a configuration that exhibits rows of parallel, oppositely-folded pleats with a clearly identifiable pleat direction $D_p$ and with a pleat spacing of at most 30 mm and a pleat height of at least 4 mm. In some embodiments, pleated fibrous web 8 may be tightly-pleated, meaning that the web exhibits, on average, a pleat spacing of at most about 10 mm, a pleat height of at least about 10 mm, and a pleat fold radius of curvature (measured on the pleat valley floor of the pleat fold) of less than 2 mm. It will be appreciated that such a tightly-pleated web may often exhibit relatively sharp-creased, "zig-zag" style pleats that are distinguished from e.g. sinusoidal pleats that exhibit folds with a relatively large radius of curvature. Such zig-zag style pleats may also often exhibit at least substantially flat pleat walls (that meet at folds that exhibit a very small radius of curvature), again in contrast to sinusoidal pleats. In some cases a pleat height that is relatively high in comparison to the average radius of curvature of the folds may be advantageous. Thus in various embodiments, the ratio of the pleat height to the average radius of curvature of the folds may be greater than 3, 6, 10, 20, 40, 60, 80, or 100. In further embodiments, the ratio of the pleat height to the average radius of curvature may be at most about 400, 200, 400, 100, 80, 40, or 20. In various embodiments, the ratio of the pleat height to the pleat spacing may be at least about 0.15, 0.25, 0.50, 0.75, 1.0, 1.5, 2.0, or 2.5.

Fibrous filtration web 8 can be pleated, e.g. tightly pleated, by any suitable method. In some embodiments, fibrous filtration web 8 is pleated by a process that is not a "corrugating" process in which the filter web is processed through a set of corrugating gears e.g. as disclosed in U.S. Pat. No. 5,256,231. (Such "corrugated" webs will be recognizable to the ordinary artisan by the relatively sinusoidal shape of the resulting media.) Useful pleating methods may include any in which a fibrous filtration web is fed to a pleating device (e.g. a blade pleater, a rotary-score pleater, and so on), which imparts folds to the web at desired intervals. The web may then be processed through a spacing device that adjusts the pleats to a desired pleat spacing and pleat height. One exemplary type of spacing device is described in U.S. Pat. No. 4,976,677 and includes a helical screw conveyor in which the flight or pitch of the screw conveyor windings establishes the desired pleat spacing. Another general type of pleat spacing device is described in U.S. Pat. No. 5,389,175 and includes a conveyor having a plurality of spaced-apart flites or cleats. Individual flites or cleats carry or hold consecutive pleats during movement of the conveyor, such that the resultant pleat spacing is dictated by the spacing between adjacent flights or cleats. The pleat spacing, however arrived at, may then be set (permanently fixed) by any desired method (e.g. by disposing bridging filaments on at least one major surface of the pleated web).

In some embodiments, e.g. if pleat folds with very small radii of curvature are desired, the pleating process may be facilitated by scoring the fibrous web to provide score lines along which the fibrous web media can be folded to form folds (fold lines). Such scoring may be performed using any desired apparatus and method, e.g. by the use of a rotary-score apparatus as will be well known to ordinary artisans. Ordinary artisans will be familiar with scoring of fibrous webs and will appreciate that such score lines in fibrous webs will typically be manifested as linear (that is, with a much greater length than width) areas in which at least some of the web fibers have been e.g. crushed, densified, consolidated, or otherwise deformed in some manner that is readily attributable to the fibrous web having been scored in those areas. Thus, in some air filter media, readily identifiable score lines may be present at folds (i.e., along pleat tips and/or pleat valleys) of the pleated fibrous web, as represented by score line 11 as shown in exemplary embodiment in FIGS. 5*a* and 7. It may be necessary to physically manipulate (e.g., partially unfold) the pleated web in order to see the score lines.

Bridging Filaments

In some embodiments, air filter media 10 comprises a plurality of bridging filaments 40 at least on first major side 2 of air filter media 10, as seen most easily e.g. in FIG. 3. Portions of at least some of the bridging filaments 40 are bonded to portions of at least some of the first-side pleat tips 21 of pleated fibrous web 8, at bonding locations 60 as shown in exemplary embodiment in FIGS. 2, 3, 5 and 5*a*. A bridging filament is one that extends between, and is bonded to, at least two same-side (e.g., first-side) pleat tips of pleated fibrous web 8. By definition, a bridging filament is not pleated along with the pleated fibrous web 8. Furthermore, a bridging filament does not follow the pleated geometry or droop to any significant extent into the pleat valleys. It will thus be appreciated that, with pleated fibrous web 8 held in an overall planar configuration in which force is not applied to pleated web 8 to "accordionize" the pleated structure into a compressed or bunched form, bridging filaments 40 will comprise an at least generally, or substantially, linear appearance when viewed from the side (rather than exhibiting a linear appearance e.g. only when viewed directly along the upstream-downstream axis of the filter media). Such a substantially linear appearance of bridging filaments 40 is evident in the exemplary embodiment of FIG. 3 and is particularly noticeable in the side view of FIG. 5. Even allowing for occasional slight deviations as may statistically occur in production processes, most portions of most filaments 40 will be spaced away from the majority of the area of the pleat walls; that is, they will be spaced apart from all such pleat wall areas except those at, or very close to, first-side pleat tips 21. First-side bridging filaments 40 are thus by definition in discontinuous contact with first major surface 25 of first major side 2 of pleated fibrous web 8. A bridging filament is thus distinguished from a strand that is formed e.g. by drizzling a bead of hardenable liquid adhesive onto a pleated structure so that it at least generally follows the pleated structure (at least generally penetrates or droops into the pleat valleys) and is then hardened in that configuration.

In embodiments of the general type shown in FIG. 3, bridging filaments 40 may be oriented at least substantially orthogonal to (e.g., within +/−about 5 degrees of 90 degrees to) the pleat direction of pleated fibrous web 8 (with pleat direction meaning a direction parallel to pleat tips 21 and 31, as signified by the Pleat Direction ($P_d$) arrow in FIG. 3). In some embodiments, bridging filaments 40 may be oriented at least essentially orthogonal to the pleat direction. In various embodiments, bridging filaments 40 may be at least generally, substantially, or essentially parallel to each other.

In some embodiments, bridging filaments 40 may extend between, and be bonded to, e.g. three, four, eight, sixteen, thirty-two, or more first-side pleat tips 21. In some embodiments, at least some bridging filaments may be continuous, meaning that they extend along the entire length of pleated fibrous web 8 (as in the exemplary design of FIG. 3). Such continuous bridging filaments thus will not be severed or otherwise made discontinuous anywhere along the entire length of pleated fibrous web 8. In any case, a bridging filament 40 (continuous or not) will be distinguished from filaments that are cut or otherwise deliberately made so short that they do not extend between at least two upstream pleat tips.

As discussed in detail later herein, in some embodiments bridging filaments 40 may already be present on first major side 2 of pleated fibrous web 8 when sorbent particles are deposited on major surface 25 of at least some areas of first major side 2 of fibrous web 8 to form sorbent-loaded areas 26. Thus in such embodiments, first-side bridging filaments 40, if present, can be sized and spaced so as to preserve sufficient spaces between bridging filaments to allow sorbent particles to pass therebetween during deposition of the sorbent particles onto first major surface 25 of fibrous web 8. In some embodiments this may be achieved by providing bridging filaments in the form of parallel filaments that are oriented at least substantially orthogonally to the pleat direction (as noted above) and that are suitably spaced apart. Thus in some embodiments bridging filaments may take the form of filaments that are individually provided (e.g., extruded separately onto pleat tips of pleated fibrous web 8) rather than provided collectively in the form of a substrate (e.g. a netting, screen, mesh or scrim). In such embodiments, at least some of the bridging filaments may be oriented at least substantially parallel to each other (and some or all may be oriented at least substantially orthogonal to the pleat direction $D_p$ of the pleated fibrous web), may not be connected with each other either directly, or indirectly by way of any other entity (except for fibrous web 8 itself). Embodiments of this type preclude the use of filaments that are e.g. part of a pre-existing scrim, screen, netting or mesh that includes filaments oriented in a wide variety of directions.

However, in general any suitable filaments, in any orientation, may be used, as long as the filaments extend across, and are bonded to, a sufficient number of pleat tips as discussed above, and as long as the filaments are spaced apart so as to allow sorbent particles to pass between filaments when the sorbent particles are deposited. Thus in some embodiments first-side bridging filaments 40 may take the form of e.g. a netting, mesh, screen, scrim or the like, rather than comprising e.g. parallel filaments in the manner of FIG. 3. In such cases, the bridging filaments may be applied to pleated fibrous web 8 as a unitary substrate rather than as individually-applied filaments. Such a substrate may be bonded to first-side pleat tips 21 e.g. by adhesive bonding (e.g. by use of an adhesive that is pre-coated onto at least some surfaces of filaments of the substrate), by melt-bonding, ultrasonic bonding, or by any suitable method. It will be understood that any such bridging filaments will still be linear when viewed in side view as discussed above; however, they may not necessarily be linear when viewed e.g. along the upstream/downstream axis of the filter media.

In various embodiments, bridging filaments may comprise an average diameter (or equivalent diameter in the case of filaments with a non-circular or irregular cross-section) of at most about 2, 1, 0.5, 0.2, or 0.1 mm. In further embodiments, the filaments may comprise an average diameter or equivalent diameter of at least about 0.05, 0.10, or 0.20 mm. Bridging filaments may comprise any suitable shape when viewed in cross section, (e.g., generally round, square, oblong, etc.). All such dimensions and shapes should be evaluated at locations between the pleat tips rather than at the bond to the pleat tips, since at least some deformation of the filament shape may occur at the bond locations. Filaments can comprise suitable spacings between individual filaments as desired. In various embodiments (e.g., when filaments 40 are arranged e.g. in parallel to each other) the filament spacing can be at least about 2, 4, 6, 8, 16 or 24 mm. In additional embodiments, the filament spacing can be at most about 50, 40, 30, 20, 15, 12, 10, or 8 mm. The filament spacings can be relatively constant or can be varied. Some inherent variation in filament spacing may occur in production and handling of filaments, of course. In various embodiments a suitable set of first-side bridging filaments 40 will collectively comprise a highly open structure (in various embodiments, comprising greater than at least 60, 70, 80, 90, or 95% line-of-sight open area in the major plane collectively established by the bridging filaments), so as to allow sorbent particles to pass between the filaments in the act of depositing the sorbent particles onto the first major surface of the pleated fibrous web.

The presence of bridging filaments at least on first major side 2 of pleated fibrous web 8 may enhance the overall rigidity of the structure (e.g. in cooperation with a perimeter support frame, if present). Such bridging filaments may be particularly helpful when used with tightly-pleated fibrous filtration webs. In embodiments of the general type shown in FIG. 4, a first set of bridging filaments 40 may be provided on the first major side 2 of pleated fibrous web 8 10 as described above, and a second set of bridging filaments 40' may be provided on the opposing, second side 3 of pleated fibrous web 8. Such second-side bridging filaments will be bonded to at least some second-side pleat tips 31. The first and second sets of bridging filaments may be similar or the same in composition (and/or in geometric parameters such as e.g. spacing, diameter, and so on); or they may differ in any or all such composition and/or parameters.

Bridging filaments 40 (and 40' if present) may be made of any material that can be satisfactorily bonded to pleat tips of pleated fibrous web 8. In some embodiments, bridging filaments 40 can be extruded as a molten stream and extrusion-bonded (i.e. a type of melt-bonding) to the pleat tips. Suitable materials may include any extrudable thermoplastic or thermoset organic polymeric materials (whether naturally occurring or synthetic). Thus, common extrudable polymeric materials (including but not limited to polyolefins such as e.g. polypropylene, polyethylene, and copolymers thereof; poly(lactic acid); polyamides; polyethylene terephthalates; and so on), may be used to form the bridging filaments. Other, minor constituents may be present, e.g. antioxidants, colorants, pigments, dyes, processing aids, and so on.

By definition, extrusion-bonded bridging filaments are not comprised of any kind of (hardened) glue or adhesive, e.g. drizzle glue or photocured adhesive. In particular, an extrusion-bonded bridging filament is not comprised of a hot melt adhesive composition. In some embodiments a bridging filament may be compositionally compatible with the organic polymeric material of the fibers of the fibrous web to which the filament is extrusion-bonded. By "compositionally compatible" is meant that the filaments of thermoplastic organic polymeric material include at least 80% by weight of monomer units of the polymeric material of the filaments that are of like chemical composition to that of by at least about 80% by weight of the organic polymer material of the fibers of the fibrous web to which the filaments are extrusion-bonded. In further embodiments, filaments may be "compositionally similar" to the organic polymeric material of the fibers of the fibrous web to which the filament is extrusion-bonded, meaning that at least 90% by weight of monomer units of the polymeric material of the filaments are of like chemical composition to that of by at least about 90% by weight of the organic polymer material of the fibers of the fibrous web. Even in the absence of the filaments being e.g. at least compositionally similar to the organic polymeric material of the fibers of the fibrous web (and in the absence of the material of the filaments exhibiting any pressure-sensitive adhesive properties), adequate melt-bonding of filaments to the pleat tips of the fibrous web may occur. Such bonding may be achieved e.g. by way of the molten material of the incipient filament penetrating into interstitial spaces between the fibers of the web.

In some embodiments, bridging filaments may be non-elastic. Non-elastic as defined herein encompasses any material that does not have the relatively high reversible extensibility (exemplified e.g. by the ability to be reversibly elongated to e.g. 100% or more without undergoing plastic deformation) characteristic of elastic materials such as natural rubber, SBR rubber, lycra, etc. In other embodiments, the filaments may be made of an elastic material (chosen from e.g. the above-listed elastic materials).

Further details of potentially useful bridging filaments, arrangements of such filaments, compositions and materials which may be suitable for use in such filaments, and the like, are found in U.S. Provisional Patent Application No. 62/346, 179, entitled Channel-Framed, Pleated Air Filter with Bridging Filaments, which is incorporated by reference in its entirety herein for this purpose.

Any set of bridging filaments as disclosed herein will be distinguished from a non-filamentary support structure or structures that may be provided e.g. on the downstream side of pleated filter media (and that are often bonded to a perimeter frame thereof and/or are bonded to the pleated filter media itself) to rigidify the pleated filter media. In other words, a set of bridging filaments as disclosed herein does not encompass e.g. perforated sheets of cardboard or metal, or strips of cardboard or metal, as are often provided on the downstream side of a pleated filter to enable the pleated filter to withstand the forces encountered in a high-pressure HVAC airflow condition. In some embodiments, no such ancillary components (e.g. perforated sheets, straps, and so on) are present. In other embodiments, any such ancillary components may be present in addition to the bridging filaments. In some particular embodiments the air filter media does not include any kind of reinforcing layer (e.g. a wire mesh) that is bonded (e.g. adhesively bonded) to a major surface of the media and is pleated along with the fibrous filtration web of the air filter media.

Bridging filaments may be applied to at least a first surface of a fibrous filtration web 8 and bonded to at least some first-side pleat tips 21 thereof, in any suitable manner. In some embodiments an adhesive may be applied to bridging filaments (whether the filaments are provided individually or in the form of a netting, screen, etc.) and the bridging filaments then brought into contact with the pleat tips and adhesively bonded thereto.

In embodiments in which bridging filaments are provided in the form of extrusion-bonded filaments, such filaments may be generated by any desired extrusion apparatus and method that will provide streams of molten extrudate in such form that they can be extrusion-bonded to pleat tips of pleated fibrous web. Such an extrusion apparatus may be any kind of extruder (e.g. a single-screw extruder, twin-screw extruder, and so on) that comprises a die with orifices for extruding an organic thermoplastic or thermoset material as molten streams in an at least generally parallel, spaced-apart relationship.

In many embodiments, the molten streams are brought into contact with the pleat tips after the pleat spacing has been established and the pleat spacing is not changed significantly after the molten streams are contacted with the pleat tips. This can provide that, as noted previously, the thus-produced filaments have an at least substantially linear appearance when viewed from the side and do not follow or contact the pleat walls down into the pleat valleys to any significant extent. In some embodiments an extrusion apparatus may be set up in-line with a pleating apparatus. For example, at least a first extruder that provides first-side bridging filaments may be used in concert with any suitable pleating apparatus, e.g. the user-selectable pleating apparatus disclosed in U.S. Patent Application Publication No. 20140235419. A second extruder, configured to extrude molten streams onto the second major side of the pleated fibrous web, may also be provided if the air filter media is to comprise second-side bridging filaments as well. In some embodiments a pleated fibrous web may be retained and stored as a pleat pack (e.g. in which the pleats are compressed together (accordionized) for easier storage of the pleat pack). The pleat pack may then be brought to the desired pleat spacing (e.g. it may be expanded from a compressed storage configuration) and the bridging filaments extruded onto, and bonded to pleat tips of, at least a first major side of the pleated web if desired.

Fibrous Filtration Web

Fibrous filtration web 8 of air filter media 10 may be of any suitable composition. Fibrous filtration web 8 is configured for air filtration (as opposed to e.g. water filtration); by definition, fibrous filtration web 8 will exhibit a Percent Penetration (using Dioctyl Phthalate as a challenge material, and tested using methods and apparatus described in U.S. Pat. No. 7,947,142 to Fox, the relevant sections of which are incorporated by reference herein for this purpose) of less than 90. In various embodiments, a fibrous filtration web 8 may exhibit a Percent Penetration of less than about 80, 70, 60, 50, 40, 30, 20, 10, or 5. Certain fibrous filtration webs 8 (e.g., those that include electret fibers) may be particularly suited for filtration of fine particles; in various embodiments fibrous filtration web 8 may exhibit an initial (fine) particle removal filtration efficiency (E1) of at least about 5, 10, 15, 20, 30, 40, or 60%, when tested using methods and apparatus described in U.S. Pat. No. 9,539,532 to Fox, the relevant sections of which are incorporated by reference herein for this purpose. In particular embodiments fibrous filtration web 8 may be comprised of a material that is capable of being tightly pleated and/or that includes at least some fibers that are capable of having filaments extrusion-bonded thereto. Potentially suitable materials may take any form including e.g. melt blown or spunbond nonwoven webs of synthetic or natural fibers; woven or knitted materials, and so on. Any suitable method of making a nonwoven web (e.g., melt-blowing, melt-spinning, air-laying, carding, and so on) may be used. In various embodiments, the thickness of fibrous filtration web 8 (i.e., the locally-measured thickness along the shortest dimension from first major surface 25 to second major surface 35, not taking into account the aforementioned pleat height) may be at least about 100, 200, 500, 1000, or 2000 microns. In further embodiments, the thickness of fibrous filtration web 8 may be at most about 3000, 2500, 1500, 800, or 400 microns.

In some embodiments fibrous filtration web 8 may be a multilayer material, as long the multilayer material includes at least one layer that is a fibrous filtration layer (i.e., that exhibits a Percent Penetration of less than 80). A multilayer fibrous web 8 may comprise e.g. laminated layers of any types of fibrous material or may comprise one or more other layers (e.g. a perforated film, a coarse prefilter, a protective layer, a decorative layer, and so on) laminated to one or more layers of fibrous filtration material. It will thus be understood that references herein to a fibrous filtration web (and in particular, references to sorbent particles being present on, e.g. bonded to, a surface of a fibrous filtration web) will be understood to encompass arrangements in which the fibrous filtration web comprises a multilayer structure and in which sorbent particles are bonded to major surface of an outermost layer of the multilayer structure.

In specific embodiments, pleated fibrous filtration web 8 may comprise an electret material, comprised of e.g. any charged material, e.g. split fibrillated charged fibers as described in U.S. Pat. RE 30782. In general, web 8 can comprise any fibers that comprise (charged) electret moieties, whether the fibers are charged prior to web formation or after the fibers are collected and consolidated into a fibrous web. Ordinary artisans will understand that such electret moieties can be detected and/or characterized e.g. by way of an X-ray Discharge Test as disclosed e.g. in U.S. Patent Publication No. 2011/0290119. Such fibers can be formed into a nonwoven web by conventional means and optionally joined to a scrim such as disclosed in U.S. Pat. No. 5,230,800 forming an outer support layer. In other specific embodiments, fibrous filtration web 8 can comprise a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. Fibrous filtration webs that may be particularly suitable for certain applications might include e.g. webs of the general type described in U.S. Pat. No. 8,162,153 to Fox; webs of the general type described in U.S. Patent Application Publication 20080038976 to Berrigan; and, webs of the general type described in U.S. Patent Application Publication 20040011204 to Both, and webs generally known as tribocharged webs. Any such fibrous filtration web can be charged to form an electret (or can include precharged electret fibers), if desired. Any such web can include fibers that comprise charging additives or the like, as will be well understood by ordinary artisans.

In some embodiments, e.g. in order to be able to be tightly pleated, fibrous filtration web 8 may advantageously comprise a relatively high stiffness. In some embodiments, the stiffness of the material may be characterized by a Gurley Stiffness (measured as described in U.S. Pat. No. 8,506,669, which is incorporated by reference herein for this purpose). In various embodiments, pleated fibrous filtration web 8 may be comprised of a material that exhibits a Gurley Stiffness (measured in an unpleated configuration) of greater than 100, 150, 175, 200, 225, 250, or 300 mg. In some embodiments, pleated fibrous filtration web 8 may comprise a spunbond nonwoven web of the general type disclosed in U.S. Pat. No. 8,506,669 to Fox. Such a spunbond web may advantageously exhibit a relatively high stiffness and may be particularly amenable to being tightly pleated and maintaining the tightly-pleated configuration. In some embodiments, pleated fibrous filtration web 8 may comprise a meltblown (BMF) nonwoven web of the general type disclosed in U.S. Pat. No. 8,142,538 to Sundet. Such a meltblown material may similarly exhibit a relatively high stiffness and may be particularly amenable to being tightly pleated and maintaining the tightly-pleated configuration.

As noted above, in some embodiments fibrous filtration web 8 may be a multilayer material. Also as noted above, in some embodiments pleated fibrous filtration web 8 may include at least one layer that is not necessarily a fibrous layer (e.g. it may be a microperforated film or a microporous membrane) and/or it may include at least one layer that does not necessarily perform a significant amount of particle filtration. All that is necessary is that web 8 includes at least one fibrous layer that is configured to perform particle filtration from a moving airstream as discussed above. In some embodiments, fibrous web 8, particularly if it includes a layer of a relatively limp material that is difficult to score and/or pleat, may include at least one additional layer (whether a fibrous layer or not) that enhances the ability of the multilayer material to be pleated. For example, in some embodiments a fibrous filtration web 8 may include a layer of organic polymeric blown microfiber (BMF) and a layer of e.g. fiberglass, with the BMF layer providing excellent ability to filter airborne fine particles and with the fiberglass layer enhancing the pleatability of the multilayer structure.

Sorbent

Pleated fibrous filtration web 8 comprises at least one active filtration area; that is, an area that is not occluded or blocked (e.g. by portions of a perimeter frame or the like), so that moving air can penetrate into, and pass through, this area of the fibrous web and be filtered. The active filtration area of fibrous web 8 will comprise at least one sorbent-loaded area 26. In some embodiments (e.g. as in the exemplary embodiment of FIG. 1), sorbent-loaded area 26 may occupy at least substantially all of the entire active filtration area of the air filter. In other embodiments, one or more sorbent-loaded zones may occupy sub-areas of the active filtration area of the fibrous web.

Figure 6:
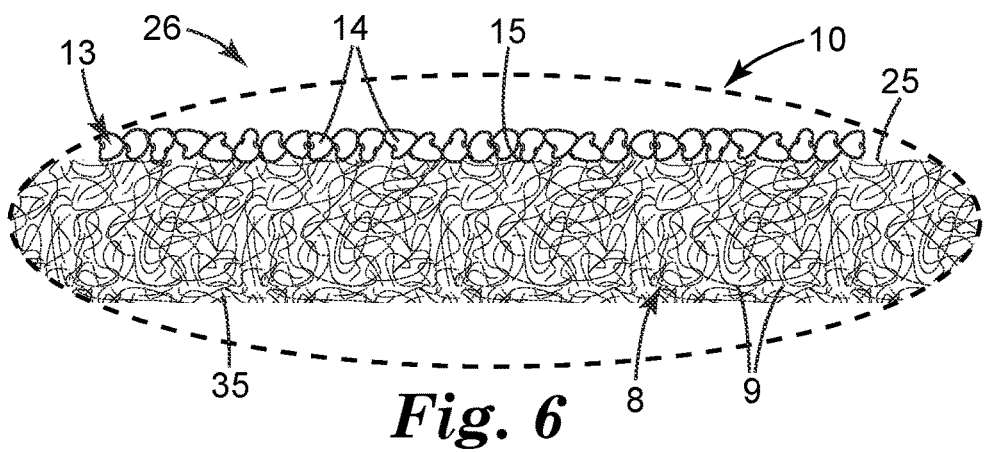
FIG. 6 is a magnified isolated cross-sectional view of a pleat wall of the exemplary air filter media of FIG. 5.

With reference to FIG. 6, by a sorbent-loaded area 26 is meant an area of filter media 10 in which sorbent particles 14 are present on first major surface 25 of fibrous web 8 at a loading of at least 20 grams per square meter ($g/m^2$). In various embodiments, a sorbent-loaded area 26 of major surface 25 may comprise a sorbent loading of at least about 40, 60, 80, 100, or 120 grams per square meter. The loading of sorbent particles will be measured and calculated with the fibrous web in a flat (planar) configuration rather than in a pleated configuration; e.g., a pleated web can be unfolded flat in order to evaluate the sorbent loading. Such sorbent-loading values, although presented in units of grams per square meter, will be applicable only to particular sorbent-loaded area(s) in question. That is, such a value will reflect the actual loading of an individual sorbent-loaded area, rather than being an overall value that is averaged over the entire active filtration area and that reflects the presence of one or more areas that are e.g. free of sorbent.

Figure 10:
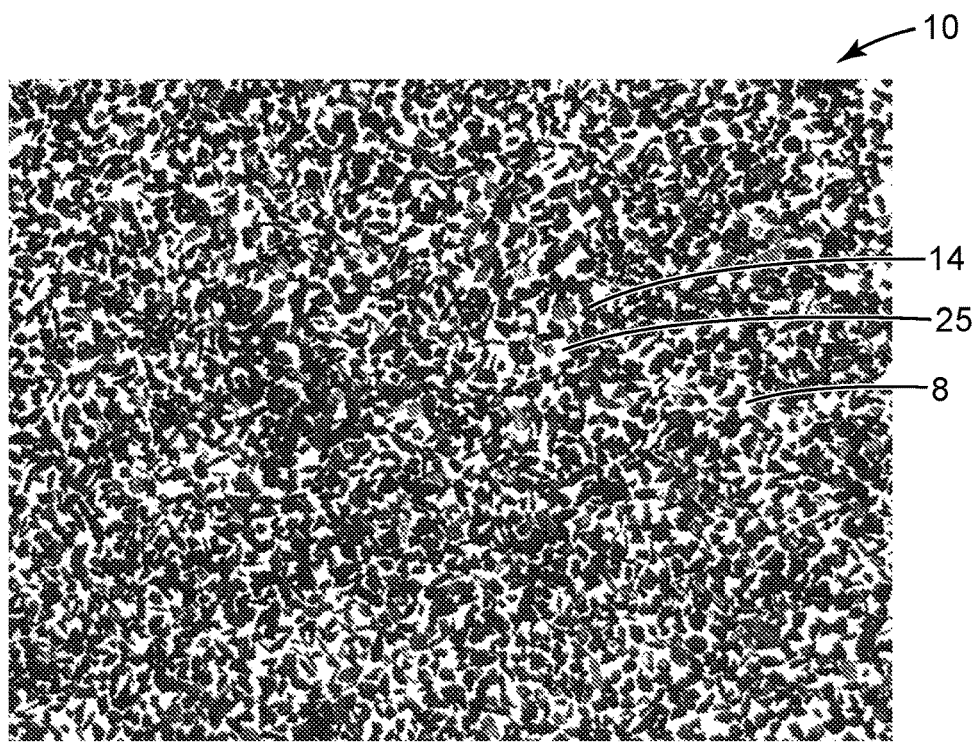
FIG. 10 is an optical micrograph showing a plan view of a Working Example air filter media with sorbent particles disposed on a first major surface of a fibrous filtration layer of the air filter media.

As shown in the exemplary embodiment of FIG. 6, a sorbent-loaded area 26 comprises a sorbent layer 13 that includes numerous sorbent particles 14. (FIG. 6 is a magnified isolated view of a portion of the pleated fibrous filtration web 8 of FIG. 5 and includes a depiction of sorbent particles 14, in contrast to FIG. 5 and FIG. 5a, in which sorbent particles are omitted for ease of presentation of geometric parameters of the pleated fibrous web of the filter media.) In various embodiments, a sorbent-loaded area 26 may comprise sorbent particles at an area coverage of at least about 40, 60, 70, 80, 90, or even 95%. The area coverage achieved by sorbent particles can be measured by optical inspection (e.g., using a photograph such as depicted in FIG. 10, which is discussed in the Working Examples) to determine the percentage of major surface 25 that is covered by sorbent particles when viewed along a line of sight that is locally perpendicular to the inspected area of web 8. For example, if the sorbent particles of FIG. 10 cover approximately 70% of major surface 25 of fibrous filtration web 8 (with approximately 30% of the area of major surface 25 being line-of-sight visible through gaps between the sorbent particles), the area coverage would be 70%.

The area coverage of sorbent particles 14 will thus provide a parameter equivalent to the percentage of an imaginary plane that is covered by a collective projected area of the sorbent particles on the imaginary plane. It will be appreciated that due to the fibrous nature of web 8 (which will cause first major surface 25 of web 8 to be irregular rather than uniformly planar), in combination with the irregular shapes of sorbent particles 14, the achieving of a particular area coverage as defined above will not correspond to an equivalent reduction in the area of fibrous web available for airflow through web 8. (For example, a sorbent particle area coverage of 80% will not correspond to an 80% reduction in the available area of fibrous web 8 through which air can flow.) This being the case, even a sorbent particle area coverage of, for example, in the range of approximately 80%, has been found to impart a relatively mild, and acceptable, increase (e.g., 15-25%, some of which may be due to the presence of an adhesive used to bond the particles to the web) in the pressure drop that is required to pass air through fibrous web 8. It will also be appreciated that the use of sorbent particles of various sizes in combination (e.g., depositing a set of particles that are polydisperse rather than exhibiting a monodisperse particle size) can provide further benefits in the packing density (area coverage) that can be achieved.

Any suitable sorbent particles 14 or a mixture of sorbent particles of various types or compositions can be used, as long as the sorbent particles are present (in a sorbent layer 13) at a suitable loading and are of a composition that renders them able to sorb (e.g. to capture, sequester, chemically react, or the like) one or more gaseous or vaporous substances from a moving airstream. In at least some embodiments, the sorbent particles include at least some activated carbon particles. Sorbent particles (e.g. activated carbon) may be provided in any usable particulate form including beads, flakes, granules or agglomerates. Sorbent particles may be configured to capture any desired gaseous or vaporous component from an airstream. At least some of the sorbent particles (e.g. activated carbon particles) may be impregnated with one or more additives as desired in order to enhance the ability of the particles to capture particular gaseous or vaporous substances. Any such sorbent particles will exhibit a stable shape and size (unless e.g. physically crushed or ground) and will be distinguished from e.g. "particles" as might be deposited on a substrate by e.g. physical vapor deposition, chemical vapor deposition, and so on. Such sorbent particles will also be distinguished from "particles" that may be deposited e.g. in the form of latexes, plastisols, and like materials.

In various embodiments the sorbent particles may include (e.g. as secondary constituents mixed with activated carbon) one or more materials such as alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); clay and other minerals treated with acidic solutions such as acetic acid or alkaline solutions such as aqueous sodium hydroxide; molecular sieves and other zeolites; silica; biocides; fungicides and virucides. In particular embodiments, sorbent particles 14 may include any of the porous polymeric sorbents described in U.S. Provisional Patent Applications Nos. 62/269,613, 62/269,626, 62/298,089, and 62/307,831, all of which are incorporated by reference herein for this purpose. Any such materials may be mixed with e.g. activated carbon if desired.

The sorbent particle size may vary as desired. In certain embodiments, the sorbent particles have a standard U.S. mesh size (rating) of at least about 12 mesh (corresponding to a nominal 1680 micrometer opening size), at least about 16 mesh (1190 micrometers), or at least about 20 mesh (840 micrometers). In further embodiments, the sorbent particles have a standard U.S mesh size (rating) no greater than about 325 mesh (44 micrometers), no greater than about 200 mesh (75 micrometers), no greater than about 100 mesh (150 micrometers), no greater than about 60 mesh (250 micrometers), no greater than about 50 mesh (300 micrometers), or no greater than about 45 mesh (355 micrometers). By way of a specific example, if the particle size of a material is described as 12×20 mesh, then 90% or more of the material will pass through a 12-mesh sieve (i.e. particles smaller than about 1680 micrometers will pass through a 12-mesh sieve) and be retained by a 20-mesh sieve (i.e. particles larger than about 841 micrometers will not pass through a 20-mesh sieve). Suitable sorbent particles include e.g. 12×20, 20×40, 20×60, 25×45, and 30×60 mesh sized granular activated carbon available from Kuraray Chemical Corporation, Canoga Park, Calif. Mixtures (e.g., bimodal mixtures) of sorbent particles having different size ranges may also be employed.

The presence of sorbent particles 14 can allow air filter media 10 to remove gaseous or vaporous substances from an airstream rather than e.g. performing only particle filtration. The capability of filter media 10 to remove gaseous or vaporous substances from an airstream may be characterized by way of a toluene removal efficiency test as disclosed in the Examples herein. In various embodiments, filter media 10 may exhibit a toluene removal efficiency of at least about 5, 10, 15, 20, or 25%, e.g. at a face velocity of about 75 cm/sec.

Attaching Sorbent to Fibrous Filtration Web

The attaching of sorbent particles 14 to first major surface 25 of pleated fibrous filtration web 8 to form sorbent layer 13 may be done in any suitable manner. In some convenient embodiments, this can be done by providing an adhesive (e.g., a pressure-sensitive adhesive (PSA)) 15 as a discontinuous layer on first major surface 25, as indicated in exemplary generic representation in FIG. 6. Such an adhesive can be disposed on one or more areas of surface 25 that are desired to become sorbent-loaded areas 26, by any suitable method. (Strictly speaking, a material that is initially deposited on major surface 25 and is then transformed into an adhesive may be termed an adhesive "precursor"; however, for convenience of description, the process of depositing an "adhesive" may be referred to herein.) For example, an adhesive (precursor) coating mixture can be coated onto one or more areas 26 and liquid then removed from the coating mixture to leave behind an adhesive (e.g. a PSA). In specific embodiments, such a precursor might be a solvent-borne solution from which solvent is removed; or, it might take the form of a water-borne emulsion or dispersion (e.g., a latex) which coagulates to provide the adhesive upon removal of the water. hi other approaches, an adhesive precursor may be hot-melt-coated onto such areas and then cooled to solidify into an adhesive (e.g. a PSA). Once such a PSA is in place, sorbent particles may be deposited onto the major surface of the web and particles that contact the PSA maybe held in place thereby.

In some embodiments an adhesive 15 may be a so-called hot-melt adhesive in which a precursor is deposited in molten form and which, when cooled and solidified, does not exhibit pressure-sensitive adhesive properties. In such cases, sorbent particles 14 may be deposited onto major surface 25 to contact the adhesive before the adhesive has cooled and solidified. Subsequent cooling and solidifying of the adhesive can then hold the sorbent particles in place. Similarly, an adhesive 15 may take the form of e.g. a photocurable or thermally-curable resin, that, when hardened, does not necessarily exhibit pressure-sensitive adhesive properties. Rather, in such embodiments sorbent particles can be contacted with the adhesive 15 and the adhesive then solidified (by whatever mechanism) to hold the sorbent particles in place.

It will thus be appreciated that adhesive 15 is not necessarily required to, and in some embodiments will not, exhibit pressure-sensitive adhesive properties (a PSA is defined herein as an adhesive that conforms to the well-known Dahlquist criterion which requires that the material exhibit a modulus at room temperature of less than $3\times10^6$ dynes/cm at a frequency of 1 Hz). It will thus be appreciated that an adhesive (precursor) can be any material that can be provided on first major surface 25 of fibrous filtration web 8 and that can be transformed into an adhesive via any suitable process, whether through e.g. loss of volatilizable material, cooling and solidifying, curing or crosslinking, and so on, regardless of whether the sorbent particles are deposited before or after the precursor is transformed into the final adhesive.

Any such adhesive may be provided (e.g. coated) on one or more areas of major surface 25 that are desired to become sorbent-loaded areas 26. It is noted that in a sorbent-loaded area 26, it is neither necessary nor desirable that an adhesive be deposited on major surface 25 as a layer that extends over the entirety of area 26 in an uninterrupted manner Such a coating might unacceptably occlude or block the airflow through fibrous filtration web 8. Rather, in at least some embodiments such an adhesive 15 may be present as a discontinuous layer (e.g., in the form of discrete parcels rather than as a continuous coating). Adhesive 15 may be deposited at as low an area loading (e.g. coating weight per unit area of fibrous web) as can still provide adequate bonding of the sorbent particles to the outermost fibers of the fibrous filtration web. This can minimize any effect of the adhesive on the airflow resistance of the air filter media. (In other words, the area coverage/loading of the adhesive, and also the composition of the adhesive (precursor), may be chosen to ensure that the adhesive does not clog the pores of the fibrous web in such manner as to unacceptably increase the pressure drop needed to achieve adequate airflow through the web.)

Figure 11:
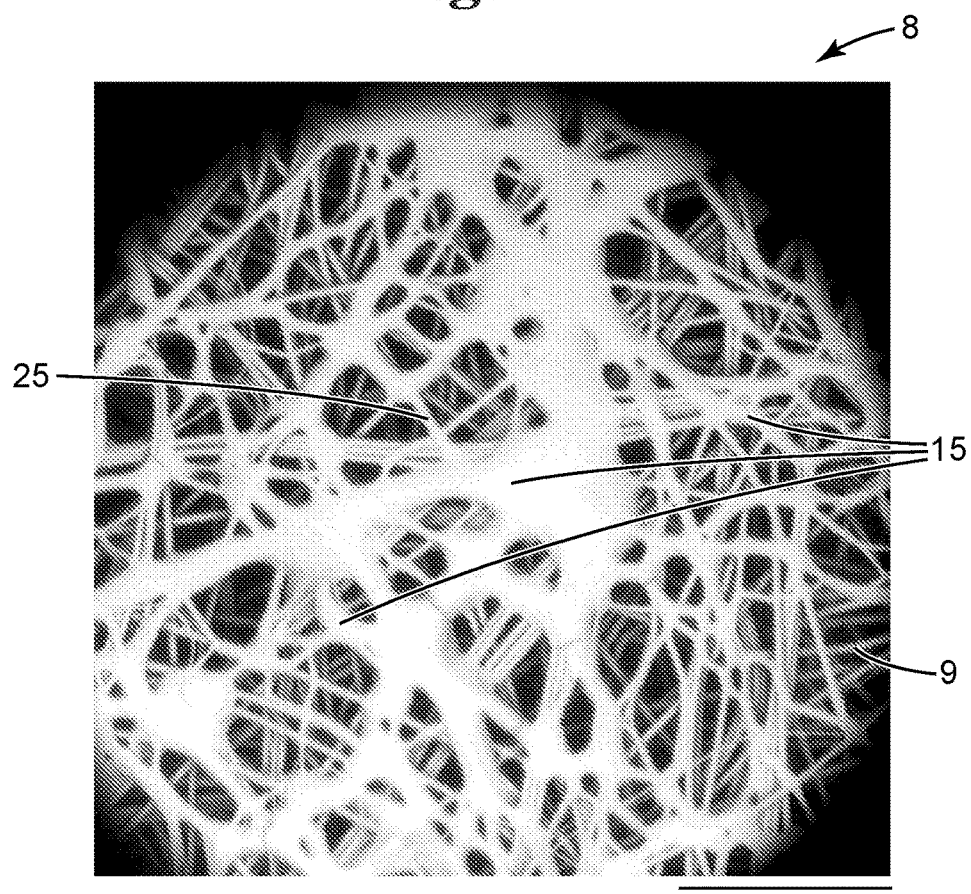
FIG. 11 is a scanning electron micrograph showing a plan view of a Working Example air filter media with a discontinuous adhesive layer disposed on a first major surface of a fibrous filtration layer of the air filter media.

An exemplary arrangement that has proven acceptable is depicted in FIG. 11, which is a scanning electron photomicrograph of a first major surface 25 of a fibrous web 8 from a Working Example. In this Working Example, a hot melt adhesive 15 (that forms a pressure-sensitive adhesive when cooled and solidified) was applied by manual spraying to major surface 25 (no sorbent particles were present in this sample, so that adhesive 15 may be viewed more clearly). Although in FIG. 11 there is little contrast in color or shade between the adhesive 15 and the fibers 9 of web 8, adhesive 15 is clearly visible as thickened areas along certain fibers and particularly at certain fiber intersections. It is thus clear that in arrangements of this type, adhesive 15 does not penetrate significantly into the interior of fibrous web 8, and it is clear that adhesive 15 forms discrete parcels on major surface 25 of the web rather than extending as a continuous (e.g. unbroken) layer.

In various embodiments, an adhesive 15 may be provided in area(s) 26 of major surface 25, at an area loading of at least about 2, 4 or 6 grams per square meter. In further embodiments, the adhesive may be provided at an area loading of at most about 16, 14, 12 or 10 grams per square meter. It has been found that such adhesive loadings typically result in only a small increase in overall thickness beyond that of fibrous web 8 alone; it has also been found that such adhesive loadings typically result in only a small increase (e.g. 5-10%) in the pressure drop that is required to pass air through fibrous web 8.

Any suitable adhesive maybe chosen, and may be deposited on major surface 25 of fibrous web 8 according to the size and pattern of sorbent-loaded areas 26 that is desired to be obtained. Any suitable method of deposition may be used, e.g. screen printing, gravure coating, roll coating, or, in general, any coating or spraying operation. Suitable adhesives (e.g. PSAs) may be chosen from e.g. the products available from BASF (Charlotte, N.C.) under the trade designation ACRONAL; the products available from 3M Company (St. Paul, Minn.) under the trade designations SUPER 77 MULTIPURPOSE SPRAY ADHESIVE and HI STRENGTH 90 SPRAY ADHESIVE; the product available from ITW (Danvers, Mass.) under the trade designation DEVCON 5 MINUTE EPDXY; and the product available from Gorilla Glue, Inc. (Cincinnati, Ohio) under the trade designation GORILLA GLUE. Various hot-melt-coatable adhesives, which may or may not exhibit pressure-sensitive properties upon cooling and solidifying, are also available for use. As noted, an adhesive or adhesive precursor (of any suitable category and composition) may be disposed on major surface 25 in a manner designed to provide the resulting adhesive in the form of finely-divided parcels rather than as a continuous layer. For example, an adhesive or adhesive precursor may be applied as a finely atomized liquid spray or the like. In some embodiments an adhesive or adhesive precursor may be deposited on major surface 25 of fibrous web 8 while fibrous web 8 is in a non-pleated (e.g. planar) configuration. In other embodiments, an adhesive or adhesive precursor may be deposited while fibrous web 8 is in a pleated configuration (which may or may not be the final pleated configuration of fibrous web 8 in air filter media 10), as discussed later herein in detail.

With an adhesive (e.g. a PSA) in place on first major surface 25 of fibrous filtration web 8, the sorbent particles can be deposited onto the first major surface 25 of fibrous web 8 in any suitable manner. In various embodiments the sorbent particles may be sprinkled, sprayed, gravity-dropped, or the like, onto the adhesive-bearing areas of major surface 25. In some embodiments, sorbent particles can be entrained in a flowing fluid stream (e.g. of air or any other gas or gaseous mixture) that is impinged onto major surface 25. In some embodiments, the sorbent particles may be deposited by electrostatic deposition methods.

Regardless of the specific method of deposition, after the deposition is complete any loose sorbent particles (i.e., particles that are not bonded to adhesive 15) may be removed by any suitable method. In some embodiments such removal methods may be passive. For example, the particles may be deposited by being propelled upward, e.g. by moving air or by electrostatic methods, to contact an adhesive-bearing major surface of the fibrous filtration web; particles that sufficiently contact the adhesive remain attached to the major surface of the web, while unbonded particles are allowed to fall away from the fibrous filtration web under the influence of gravity. In some embodiments such removal methods may be active. For example, a stream of suitable fluid (e.g. as obtained from an air knife) may be impinged upon, and/or passed through, the fibrous filtration web to remove unbonded particles. Alternatively to this, or in combination with this, a mechanical brush or some other implement may be contacted with the major surface of the fibrous filtration web to remove any unbonded sorbent particles. In some embodiments, a combination of passive and active removal methods may be used. Such methods may provide that sorbent layer 13 of air filter media 10 is at least substantially free of loose (unbonded) sorbent particles, except for such loose particles as may be occasionally statistically present in any real-world product.

The above-recited processes and arrangements can provide that in some embodiments a sorbent-loaded area 26 of fibrous filtration web 8 will comprise a layer 13 of sorbent particles 14 that is at least substantially in the form of a monolayer. That is, in such embodiments there will be few if any instances in which sorbent particles are e.g. stacked upon each other so that outermost particles are not in contact with fibrous filtration web 8. However, it will be appreciated that since the first major surface 25 of fibrous filtration web 8 will be collectively provided by outermost sections of fibers 9 of fibrous filtration web 8, "surface" 25 will not be continuous and may be somewhat uneven (non-planar). This being the case, sorbent particles 14 of layer 13, even if present substantially as a monolayer, may not necessarily be arranged in a strictly coplanar fashion. Regardless of such nuances, the herein-disclosed arrangements in which sorbent particles 14 are present "on" a major surface 25 of fibrous filtration web 8 will be distinguished from arrangements in which sorbent particles are embedded within the interior of a fibrous web and are held within the web e.g. by way of physical entrapment by the fibers and/or by way of adhesive fibers, binding resins, or the like, that are present within the interior of the web.

It will be appreciated that in the arrangements disclosed herein (in which sorbent particles are deposited onto a major surface 25 of an existing fibrous filtration web 8), there may be little or no penetration of the sorbent particles into the interior of the web. That is, in many embodiments the size of most of the sorbent particles may be larger than the size of interstitial spaces between fibers 9 of fibrous filtration web 8, thus at least a substantial majority of the particles will be unable to penetrate into the interior of the web (an exemplary arrangement of this type is readily apparent in the Working Example photo of FIG. 9). Thus, although in the present arrangement there may be some incidental penetration of a small number of sorbent particles into the interior of fibrous filtration web 8, the present arrangement will be distinguished from any arrangement in which significant numbers of sorbent particles are purposefully embedded within the interior of a fibrous filtration web.

It is emphasized that sorbent particles 14 will be present on fibrous web 8 as a surface layer 13, even in embodiments in which fibrous filtration web 8 may include one or more adhesives (e.g. in the guise of bonding fibers, binder particles or the like) that are distributed throughout the interior of the web rather than only being present on a near a major surface of the web. For example, a fibrous web 8 might comprise an adhesive in the form of e.g. heat-activatable bonding fibers that are distributed through the entire thickness of the web; however, only those bonding fibers that are located at first major surface 25 will be able to be contacted by sorbent particles so as to bond to the particles.

The thickness of sorbent layer 13 can be chosen as desired. In some embodiments, e.g. when sorbent layer 13 is present substantially a monolayer, the thickness of sorbent layer 13 may be significantly influenced or set by the dimensions of the sorbent particles. For example, if sorbent particles 14 were present as a monolayer comprising a monodisperse set of spheres of 500 µm diameter, the thickness of the resulting sorbent layer would be expected to be in the range of 500 microns. In actuality, a set of sorbent particles 14 will exhibit a range of dimensions as noted earlier herein; the thickness of sorbent layer 13 should be obtained by averaging over a sufficiently large sorbent-loaded area to arrive at a statistically meaningful value. In various embodiments, the thickness of sorbent layer 13 may be at least about 100, 200, 500, 1000, or 2000 microns. In further embodiments, the thickness of sorbent layer 13 may be at most about 3000, 2500, 1500, 800, or 400 microns.

Figure 9:
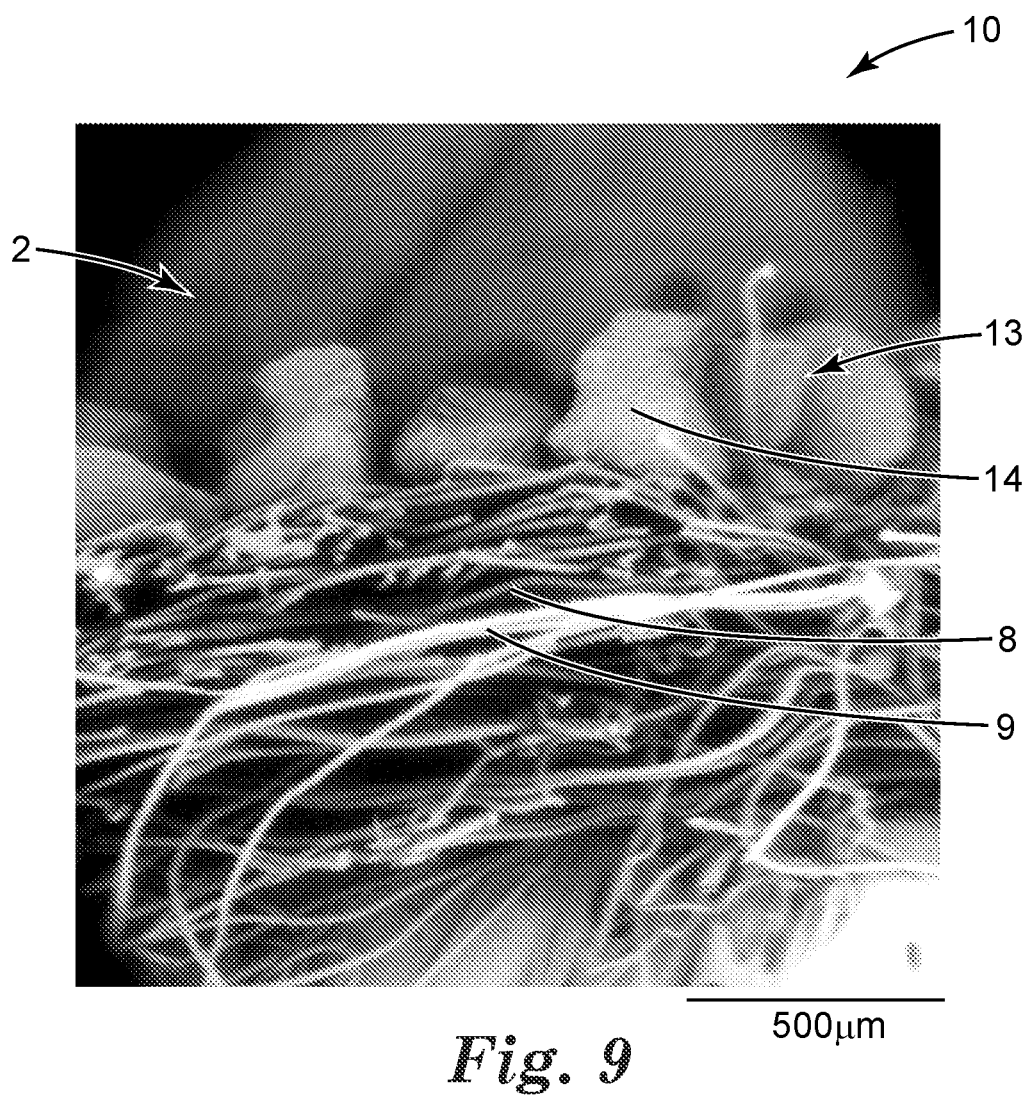
FIG. 9 is an optical micrograph showing a cross-sectional view of a Working Example air filter media with sorbent particles disposed on a first major surface of a fibrous filtration layer of the air filter media.

In various embodiments, a ratio of the thickness of sorbent layer 13 to the thickness of fibrous filtration web 8 may be at least about 0.5, 0.75, 1.0, 1.25, 1.50, 1.75, or 1.20. That is, the thickness of the sorbent layer may be at least about 50, 75, 100, 125, 150, 175, or 200% of the thickness of fibrous filtration web 8. This thickness ratio may have any suitable upper limit, e.g. the thickness of sorbent layer 13 may be less than about 400, 300, 200, or 100% of the thickness of fibrous filtration web 8. In such calculations, the thickness of the fibrous filtration web does not include the thickness of the sorbent layer. By way of specific example, if a nonwoven fibrous filtration web with a thickness of approximately 500 microns was obtained and a sorbent layer with an average thickness of 500 microns was deposited thereupon (disregarding any small thickness that might be imparted e.g. by an adhesive used to bond the particles to the web), the ratio of the sorbent layer thickness to the fibrous filtration web thickness would be approximately 1.0. Based on the above discussions it will be appreciated that in many embodiments the thickness of sorbent layer 13 may be a significant fraction of, or can even exceed, the thickness of the fibrous filtration web 8 upon which the sorbent layer is deposited. (This is illustrated in FIG. 9, which shows a side cross-sectional view of a Working Example fibrous filtration web 8 with a layer 13 of sorbent particles 14 disposed thereon.)

In various embodiments, the total thickness of air filter media 10, including both fibrous filtration web 8 (which again may be a multilayer material) and sorbent layer 13, may be at least about 0.5, 1.0, 1.5, or 2.0 mm. In further embodiments, the total thickness of the air filter media maybe at most about 10, 8, 6, 4, 2, or 1.0 mm. (These numbers will be understood to be local thicknesses and do not take into account the aforementioned pleat height.)

Post-Pleat-Deposited Sorbent Particles

Sorbent particles 14 are post-pleat-deposited particles. By this is meant that sorbent particles 14 are deposited on major surface 25 of fibrous filtration web 8 to form at least one sorbent-loaded area 26, after fibrous filtration web 8 has already been folded into a pleated configuration. Specifically, the deposition of sorbent particles 14 is carried out with fibrous filtration web 8 at least substantially folded into the final pleated configuration (as manifested in a pleat spacing and pleat height that are specific and stable) which will be present in air filter 1 as used by a user. Ordinary artisans will appreciate that in handling and processing of substrates such as nonwoven webs, filtration media and the like, it is conventional practice to perform as many processing steps as possible (e.g. charging of electret fibers of a web, heat treatment to activate bonding fibers of a web, surface treatment (e.g. corona treatment) e.g. to enhance the bondability of the substrate surface, deposition of one or more layers of additional material onto the substrate, and so on) with the substrate in a planar (e.g. unpleated) condition for ease of processing and handling and so that maximum uniformity can be achieved. Thus, it is common for a process step such as pleating to be carried out toward the end of a filter-production process, e.g. shortly before a continuous substrate (e.g. a nonwoven filtration web) is divided into discrete entities and packaged. Conventionally, other process steps, such as deposition of additional components onto the substrate, have been carried out earlier in the production process, before the substrate is pleated.

In the present work, it has been discovered that advantages can accrue from depositing sorbent particles 14 onto first major surface 25 of fibrous filtration web 8 after web 8 has been folded into a pleated configuration, rather than depositing such particles while web 8 is in an unpleated (e.g. planar) configuration. For example, post-pleat deposition of sorbent particles can provide that web 8 need only undergo minimum additional processing after deposition of the sorbent particles, thus minimizing the extent to which the deposited sorbent particles 14 may be loosened, dislodged, or otherwise damaged or compromised by further processing. This can be contrasted to approaches in which a fibrous filtration web is subjected to a pleating process with sorbent particles already present in or on the web, in which case the pleating process may damage and/or dislodge sorbent particles. In particular, the process of scoring a fibrous filtration web (which is often advantageous or even necessary, particularly if a tightly-pleated configuration is desired) to facilitate pleating can crush sorbent particles that are present in the area of the web that is scored. This can generate dust and debris which may detract from the aesthetics, and/or from the performance, of the finished air filter (and may also contaminate the production line). Still further, deposition of sorbent particles 14 after pleating is complete can allow that any weed (e.g. one or more edges of the fibrous filtration web) that needs to be removed from the pleated web can be removed prior to deposition of sorbent particles, thus reducing the expense of sorbent particles that are applied to weed areas of the web and subsequently discarded.

The fact that at least some (e.g., at least substantially all) sorbent particles 14 are post-pleat-deposited particles can be ascertained by inspection of any number of properties of filter media 10. That is, an air filter media 10 as disclosed herein will exhibit one or more distinctive structural characteristics that indicate that at least some (e.g. all) sorbent particles 14 were deposited on first major surface 25 of fibrous filtration web 8 to form the at least one sorbent-loaded area 26, subsequent to fibrous filtration web 8 being folded into a pleated configuration.

For example, with reference to FIG. 5, an ordinary artisan would expect that if sorbent particles were present on first major surface 25 of first major side 2 of fibrous web 8 prior to web 8 being pleated, the subsequent folding of fibrous web 8 into a pleated configuration such as that of FIG. 5 would give rise to a locally higher area coverage exhibited by sorbent particles in first-side pleat valley floors 20 and to a locally lower area coverage of sorbent particles on first-side pleat tips 21. That is, the particles would appear to be jammed closer together (along a direction perpendicular to the pleat direction $D_p$) in first-side valley floors 20 and to be spread further apart on first-side pleat tips 21. While such a difference in appearance might not necessarily be large, an ordinary artisan would nevertheless expect that a statistically significant difference in the spacing (area coverage) of the sorbent particles in the pleat tips and pleat valley floors would be observable in the instance that the sorbent particles were present when the fibrous web was folded into a pleated configuration. In contrast, little or no such relative jamming/spreading of sorbent particles in pleat valley floors and pleat tips would be expected, in the instance that sorbent particles were not already present when pleating was performed.

In addition, for a fibrous web that already includes sorbent particles on a major surface thereof at the time of pleating, it would be expected that the radius of curvature of pleat folds that comprise sorbent particles on valley floors would differ at least slightly from (i.e., would be greater than) the radius of curvature of pleat folds that do not comprise particles on the valley floors. That is, the radius of curvature of first-side sorbent-particle-bearing pleat valley floors 20 would be expected to be greater than the radius of curvature of second-side pleat valley floors 30 that do not bear sorbent particles, because the presence of the sorbent particles during pleating will physically interfere with valley floor 20 being deformed (folded) to as small as radius of curvature as valley floor 30. With reference to FIG. 6, such a phenomenon may be particularly evident when the dimensions of the sorbent particles 14 are such that the thickness of sorbent layer 13 is significant compared to the thickness of fibrous web 8 itself, and/or when a tightly-spaced pleat configuration is sought. Thus, the existence of a statistically significant difference in the radius of curvature of first-side (sorbent-bearing) pleat valley floors from that of second-side (sorbent-free) pleat valley floors is indicative that sorbent particles were present during the pleating process. In contrast, the radii of curvature of (sorbent-bearing) first-side and (sorbent-free) second-side valley floors resulting from a pleating process performed with sorbent particles not yet present, would not be expected to differ in this manner and would thus be indicative of the presence of post-pleat-deposited sorbent particles.

Still further, an ordinary artisan would expect that the fact that sorbent particles 14 were present during scoring of a fibrous web 8 (rather than the sorbent particles merely being present when a previously-scored web was folded to form a pleated structure) would be readily identifiable, by the crushing of the sorbent particles along the score line and the resultant localized reduction in sorbent particle size, the presence of sorbent-derived dust and debris, and so on.

In the present work another distinctive structural characteristic that indicates the presence of post-pleat-deposited sorbent particles has been observed, as attested to in the Working Examples herein. With reference to the idealized view of a terminal portion of a first-side pleat valley 22 shown in FIG. 7, it has been found that deposition of sorbent particles 14 onto major surface 25 of a fibrous web 8 after the fibrous web has been pleated, typically results in a lower local loading/area coverage of sorbent particles 14 in first-side pleat valley floors 20, in comparison to the local loading/area coverage of sorbent particles on first-side pleat walls 23. This phenomenon may be assessed e.g. by way of optical microscopy or scanning electron microscopy of the pleat walls and the pleat valley floors. However, particularly if the sorbent particles include e.g. activated carbon, which is relatively dark in color, and if the fibrous web is relatively light-colored (as are many nonwoven webs), this phenomenon can give rise to a characteristic, macroscopically observable "zebra-stripe" pattern of relatively dark-colored first-side pleat walls and relatively light-colored first-side pleat valley floors, which has been encountered in numerous Working Examples.

In some embodiments, such phenomena can cause the condition that the at least one sorbent-loaded area 26 of first major side 2 of pleated fibrous filtration web 8 comprises at least some first-side pleat valley floors 20 that each exhibit a local loading of sorbent particles 14 that is below 50 percent of a local loading of sorbent particles 14 on a pleat wall 23 that flanks the pleat valley. It will be understood that all such quantitative ratios will be obtained from comparisons of local loadings (even if reported e.g. in grams per square meter). That is, such a ratio will be obtained from e.g. visual inspection of a pleat valley floor area that, while large enough to permit a statistically meaningful result, is still a local area (e.g. of a few square mm in size) of a single pleat valley floor. The sorbent particle loading of this local area is then compared to that of a similarly inspected local area of a pleat wall that flanks the inspected pleat valley floor. All such quantitative loading values will be obtained by inspection of the particular area along a viewing axis that is locally normal to the inspected area (e.g. by flattening out a pleat valley floor into a planar shape). In various embodiments, at least some first-side pleat valley floors 20 may each exhibit a local loading of sorbent particles 14 that is below 40, 30, 20, 10, or 5 percent of the local loading of sorbent particles on a pleat wall 23 that flank the pleat valley floor. (By way of specific example, if a local sorbent loading in a pleat valley floor is measured to be approximately 5 grams per square meter, and if a local sorbent loading on a pleat wall that flanks that pleat valley floor is measured to be approximately 30 grams per square meter, this would represent a ratio of 5/30 or approximately 17%).

Figure 7:
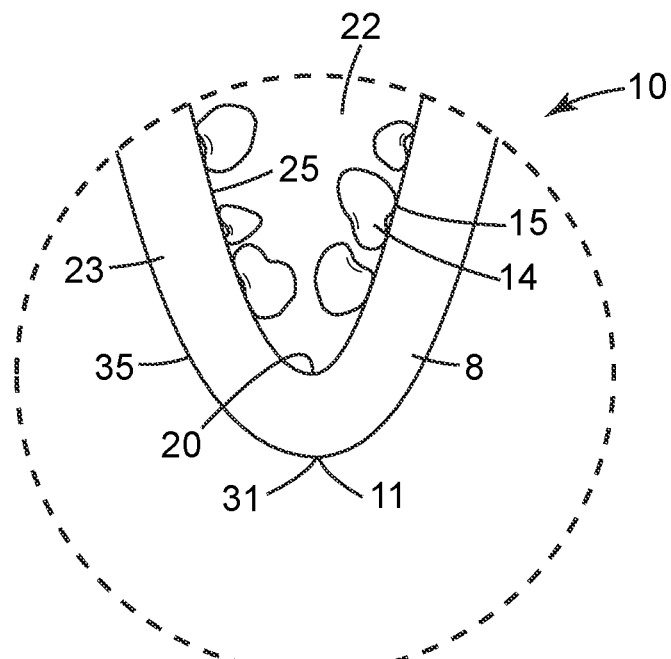
FIG. 7 is a magnified isolated cross-sectional view of a first-side pleat valley floor of the exemplary air filter media of FIG. 5.

While not wishing to be limited by theory or mechanism, it is postulated that such phenomena may occur at least in part by way of the presence of adhesive on the sloping pleat walls. It might be expected that co-facing pleat walls 23 (as shown e.g. in FIG. 7) would act as a funnel during sorbent particle deposition so that many sorbent particles would end up on valley floor 20; however, the fact that pleat wall surfaces 25 comprise exposed adhesive may cause sorbent particles to attach to pleat wall 23 at the point of first contact rather than tumbling off to continue to the valley floor. This attachment of sorbent particles 14 to pleat walls 23 may have the result that only a few sorbent particles, that happen to be on a trajectory that leads directly to valley floor 20, are actually able to reach valley floor 20. Moreover, a build-up of sorbent particles 14 at the point at which pleat walls 23 begin to closely approach each other (e.g., to within two mm or less) can form a bottleneck that can largely prevent any further sorbent particles (even those whose trajectory would bring them directly to valley floor 20) from reaching valley floor 20, as is evident from inspection of FIG. 7. While such behavior appears to be more pronounced for fibrous webs 8 that are tightly pleated, the phenomenon has also been observed with less aggressive pleating patterns. (It will be appreciated that FIG. 7 is an idealized representation and that first-side valley floor 20 is not necessarily completely devoid of sorbent particles.) Thus in summary, the presence of a statistically observable reduction in the loading/area coverage of sorbent particles 14 in a pleat valley floor 20, in comparison to the loading/area coverage of sorbent particles on a pleat wall that flanks the pleat valley floor, is indicative of post-pleat-deposited sorbent particles.

It is thus emphasized that the fact that a fibrous web comprises a layer of post-pleat-deposited sorbent particles (in contrast to a web that bears sorbent particles that were deposited prior to the web being pleated) can be inferred by one or more distinctive structural characteristics that can be observed e.g. by visual inspection of the resulting filter media. Some such structural characteristics may be expected by an ordinary artisan based on his or her background knowledge in combination with the disclosures herein; some may be characteristics that have been specifically identified in the present work. And, in particular embodiments (e.g. when sorbent particles are deposited onto the first major side of a fibrous filtration web after bridging filaments have been bonded to the first major side of a pleated fibrous filtration web) still other ways of inferring that the sorbent particles are post-pleat-deposited will be apparent, as discussed in detail later herein.

In some embodiments, not only are sorbent particles 14 deposited after web 8 has been folded into a pleated configuration, adhesive 15 may likewise be deposited on major surface 25 of first major side 2 of fibrous filtration web 8 with web 8 having already been folded into a pleated configuration. This may be performed in any suitable manner, e.g. by passing first major side 2 of pleated fibrous filtration web 8 by any suitable spray-deposition apparatus. It will be apparent that deposition of adhesive 15 after the pleating process has been completed, can reduce processing difficulties that might otherwise result from having to input an adhesive-bearing fibrous web into a pleating process (for example, depositing the adhesive after pleating would eliminate any need for preventing adhesive-bearing area(s) of the fibrous web from contacting components of the pleating apparatus).

Beyond such considerations, depositing (e.g. by spraying) adhesive 15 onto first major side 2 of fibrous filtration web 8 with web 8 already folded into a pleated configuration can cause the impinging of adhesive 15 onto major surface 25 of pleat walls 23 of web 8 to occur at a glancing angle. This can advantageously increase the percentage of adhesive 15 that remains at or near major surface 25 of web 8 so that it can be effective in bonding sorbent particles 14. (In contrast, impingement of adhesive 15 onto major surface 25 of fibrous web 8 at e.g. a near-normal angle of incidence may result in a larger percentage of adhesive penetrating deeper into web 8 to a location at which it is not effective to bond sorbent particles 14 that are deposited on the surface of web 8.) Such arrangements may allow that a minimum amount of adhesive 15 may be used, which may result in minimal blockage of the interstitial spaces of web 8, thus causing only a minor or negligible increase in the pressure drop needed to pass air through fibrous filtration web 8.

In addition, deposition of adhesive 15 onto major surface 25 of fibrous web 8 with fibrous web 8 already folded into a pleated configuration may enhance the ease with which the presence of post-pleat-deposited sorbent particles 14 may be inferred. Specifically, it has been observed that adhesive 15 (e.g. provided in the form of a hot-melt-adhesive (precursor) that is sprayed onto the surface of fibrous web 8 and which then cools and solidifies to form a pressure-sensitive adhesive) can in some instances form tendrils that can bridge across first major side pleat valley 22 at a point at which co-facing pleat walls 23 begin to closely approach each other. In other words, this can cause an adhesive "spiderweb" to form deep within valley 22 (e.g. close to valley floor 20). Upon subsequent deposition of sorbent particles 14, such an adhesive spiderweb can hinder (e.g. can largely prevent) sorbent particles 14 from reaching valley floor 20. This can further accentuate the "zebra-stripe" pattern discussed above.

In some embodiments, adhesive 15 may be deposited with fibrous filtration web 8 in a pleated configuration, but which is not the final pleated configuration which web 8 will exhibit in the finished air filter. For example, web 8 may be folded to a first pleated configuration, adhesive 15 may be deposited, and web 8 may then be folded to a second (e.g. a tighter), final pleated configuration. In some embodiments, after sorbent particles 14 are deposited (and with fibrous web 8 maintained in its pleated configuration), a secondary adhesive may be applied (e.g. at a low loading) in order to further secure sorbent particles 14 in place. Such a secondary adhesive may be of any suitable type and composition. In some embodiments, a secondary adhesive may be applied to the initially-deposited sorbent particles and then an additional number of secondary sorbent particles may be deposited atop the initially-deposited sorbent particles to be bonded in position by the secondary adhesive. It will be appreciated that in such embodiments the sorbent particles may not necessarily be present substantially in a monolayer. That is, in such embodiments, the sorbent particles may be present as a multilayer stack. In various embodiments, such secondary sorbent particles may be of the same composition as the initially-deposited sorbent particles, or may be of a different composition.

Figure 8:
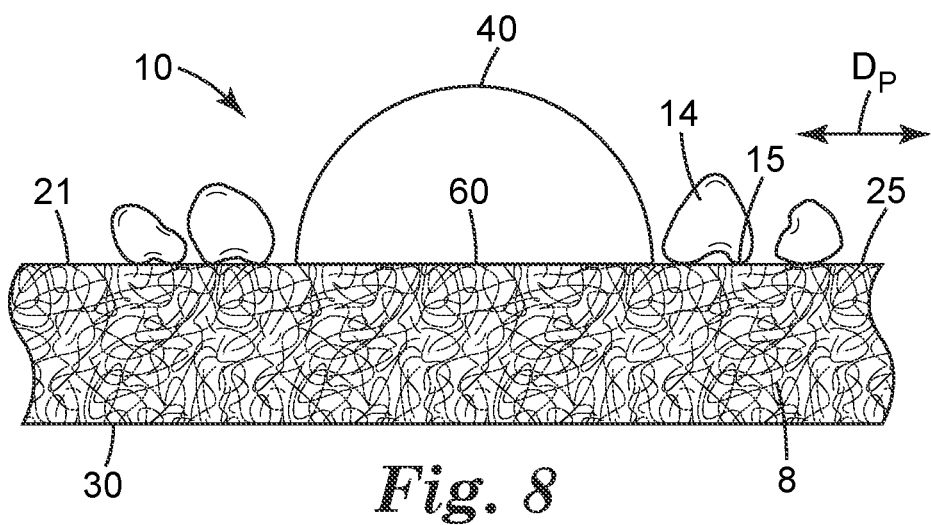
FIG. 8 is a magnified isolated cross-sectional view of a first-side pleat tip of an exemplary air filter media, showing a bridging filament bonded to a portion of the pleat tip.

As discussed earlier herein, in some embodiments bridging filaments 40 may be present on first major side 2 of pleated fibrous filtration web 8, and bonded to at least some first-side pleat tips 21 of pleated web 8 at bonding locations 60, as shown in exemplary embodiment in FIGS. 3 and 5 and as shown in magnified isolated view in FIG. 8. (FIG. 8 is a side view looking along the overall major plane of pleated fibrous web 8 in a direction perpendicular to the pleat direction $D_p$; i.e., the view of FIG. 9 is rotated 90 degrees from the view of FIG. 5a.) In some embodiments, bridging filaments 40, if present, may be applied after sorbent particles 14 are deposited on first major surface 25. In other embodiments, bridging filaments 40 may already be present when sorbent particles 14 are deposited on first major surface 25. It will be appreciated that applying bridging filaments 40 to web 8 before sorbent particles 14 are present can advantageously provide that, at pleat tips 21, bridging filaments 40 are bonded to the fibrous material of web 8 rather than being bonded to any sorbent particles 14 that might have been deposited onto pleat tips 21. Such arrangements may enhance the fidelity of the bonding of the bridging filaments to the pleat tips of fibrous web 8.

Filter media 10 may exhibit one or more structural characteristics that indicate that at least some (e.g. all) of the sorbent particles 14 were deposited on first major surface 25 of first major side 2 of pleated fibrous filtration web 8 to form the at least one sorbent-loaded area 26, subsequent to bridging filaments 40 being disposed on first major side 2 of pleated fibrous filtration web 8 and being bonded to at least some pleat tips 21 of pleated fibrous filtration web 8. With reference to FIG. 8, structural characteristics that indicate that sorbent particles 14 were deposited on major surface 25 after bridging filaments 40 were already in place on pleated fibrous web 8 (thus implying that the sorbent particles were deposited with fibrous web 8 already in a pleated configuration) may be quite straightforward. Post-pleat-deposited sorbent particles 14 will not be able to bond to major surface 25 of fibrous web 8 at locations 60 at which bridging filaments 40 are bonded to major surface 25 of pleat tips 21 of fibrous web 8. That is, in bonding locations 60, the bridging filaments cover (e.g. are in direct contact with) major surface 25 of pleat tips 21 thus they physically block any access of sorbent particles to these areas of major surface 25 of fibrous web 8. This being the case, bridging filaments 40 may be physically detached from pleated web 8 to uncover major surface 25 of pleat tips 21 at bonding locations 60 to ascertain the presence or absence of sorbent particles 14 on major surface 25 of web 8 at bonding locations 60 of pleat tips 21. If no sorbent particles 14 are present on major surface 25 in bonding locations 60, it can be concluded that the sorbent particles must have been deposited onto major surface 25 after the attachment of bridging filaments 40 to the pleat tips. Since bridging filaments 40 must have been applied to the pleat tips after fibrous web 8 was pleated, it follows that the sorbent particles must have been deposited on major surface 25 after fibrous filtration web 8 was folded into a pleated configuration. It is thus clear that in embodiments in which bridging filaments 40 are present on first major side 2 of pleated fibrous filtration web 8, yet another method is available to ordinary artisans to determine whether sorbent particles 14 are post-pleat-deposited particles. By way of a specific example, in embodiments in which sorbent particles 14 include (dark-colored) activated carbon and fibrous web 8 is a light-colored nonwoven web, in addition to the previously-described "zebra stripe" phenomenon in which relatively light-colored peak valley floors may be observed, relatively light-colored spots may similarly be observed at bonding locations 60 of pleat tips 21 after removal of bridging filaments 40, and are similarly indicative of post-pleat-deposited sorbent particles.

It is emphasized that removal of bridging filaments 40 is not to be performed during, or for purposes of, ordinary use of filter media 10 for air filtration. Rather, the above-described filament-removal procedure is strictly a diagnostic test by which the presence of post-pleat-deposited sorbent particles may be ascertained. It will also be appreciated that in some circumstances other portions of bridging filaments 40, not just those portions that are bonded to pleat tips 21, may cast a slight "shadow" during the sorbent particle-deposition process, which may provide yet another way in which the presence of post-pleat-deposited sorbent particles 14 may be ascertained.

In various embodiments, an adhesive 15 may be applied to first major surface 25 of pleated fibrous filtration web 8 either before or after bridging filaments 40 are applied to first major side 2 of web 8. In some embodiments, adhesive 15 may be applied first, with bridging filaments 40 being applied thereafter. In such embodiments, adhesive 15 is thus deposited without bridging filaments 40 in place, such that bridging filaments 40 will exhibit little or no adhesive 15 on their surfaces. This can provide that in embodiments in which sorbent particles 14 are deposited onto a pleated fibrous filtration web 8 that comprises first-side bridging filaments 40, any sorbent particles that strike a bridging filament 40 during the deposition process will be unlikely to adhere to the bridging filament, since the bridging filaments, in particular the outward-facing surfaces thereof, will not comprise an adhesive. Rather, substantially all such sorbent particles will continue their journey so as to eventually contact adhesive-bearing major surface 25 of fibrous web 8 and be adhesively bonded thereto.

Production of Fibrous Filtration Web

Various process steps, including web pleating, adhesive application, deposition of sorbent particles, and attachment of bridging filaments, have been disclosed and discussed. Some exemplary ways in which such process steps may be arranged, combined and used to provide an air filter media comprising a pleated fibrous filtration web that comprises a layer of post-pleat-deposited sorbent particles will now be presented.

A fibrous filtration web 8 may be obtained in any suitable manner, of any suitable configuration and/or composition. If desired, the filtration web 8 may be an electret web; in such cases the electret fibers may include pre-charged fibers that are incorporated into web 8; or, the fibers may be charged after web 8 has been formed. Although in some embodiments fibrous filtration web 8 can be generated in-line with the other process steps described herein, in many embodiments it may be convenient for web 8 to be made (e.g., melt-blown or melt-spun, and other layers added thereto if desired) separately and then input to the herein-described process steps as a roll good. Similarly, such a roll good may be subjected to a charging procedure (e.g. by corona-charging, hydrocharging, and so on) to generate charged electret moities in-line with subsequent process steps; or, a pre-charged fibrous filtration web may be input to these process steps as a roll good.

Fibrous filtration web 8 can be folded into a pleated configuration as discussed earlier herein; as noted, in some embodiments, web 8 may be scored to facilitate the pleating process. Web 8 can then be held in the desired pleated configuration and a discontinuous layer of adhesive 15 deposited onto first major surface 25 of first major side 2 of web 8. In some embodiments the holding of web 8 in a pleated configuration may be achieved at least in part by use of a temporary holding fixture (e.g. comprising a series of flites or cleats) that holds web 8 from the second major side (i.e., the side opposite the side that receives the adhesive spray) while the adhesive-deposition process (and the subsequent sorbent particle-deposition process) is performed.

In some embodiments web 8 may be held in a pleated configuration (i.e. the final pleated configuration of web 8) by disposing bridging filaments 40' (as shown in exemplary embodiment in FIG. 4) on second major side 3 of web 8 as mentioned previously. This may enhance the ease with which web 8 can be held in the appropriate pleated configuration during deposition of adhesive and/or sorbent particles, although a temporary holding fixture may still be used if desired. It will be appreciated that there will be no need to deposit any sorbent particles on second major side 3 of web 8, unless in some specific embodiment it is desired to produce a fibrous filtration web that has sorbent particle layers on both sides. This being the case, second-side bridging filaments 40' may be selected from any suitable screen, mesh, scrim, or set of individual filaments, without regard to any difficulties that would arise were sorbent particles required to be passed through this set of bridging filaments. There may thus be considerable latitude in choosing second-side bridging filaments 40'. In some embodiments, the production and attachment of second-side bridging filaments 40' to fibrous filtration web 8 may be done in-line with the process of pleating fibrous filtration web 8.

With web 8 being held in a suitable pleated configuration, stabilized e.g. by any suitable combination of second-side bridging filaments 40' and temporary holding fixtures, adhesive 15 may be applied to first major surface 25 of first major side 2 of pleated fibrous filtration web 8, e.g. by any of the methods discussed previously herein. In some embodiments, the adhesive-deposition process can be done in-line with the process of pleating fibrous filtration web 8. If the adhesive is e.g. liquid-borne (e.g. in the form of a water-borne or solvent-borne mixture or solution) an appropriate interval of time can be allowed for sufficient drying (augmented by exposing web 8 to an elevated temperature if desired) before subsequent deposition of sorbent particles. If the adhesive is e.g. a hot-melt adhesive that cools to provide a material that is not a pressure-sensitive adhesive, the timing of subsequent deposition of sorbent particles onto major surface 25 can be chosen to ensure that the adhesive is still at least partially molten (and thus able to bond sorbent particles) when the sorbent particles come in contact with the adhesive.

With a discontinuous layer of adhesive 15 in place on first major surface 25 of first major side 2 of pleated fibrous filtration web 8, sorbent particles 14 may be deposited on first major surface 25 of web 8 to be held in place by adhesive 15. As noted, in some embodiments, first-side bridging filaments 40 may be applied to first major side 2 of pleated fibrous filtration web 8 prior to deposition of sorbent particles 14 on first major surface 25 of web 8. In such cases, during sorbent particle deposition the sorbent particles will be passed through open spaces between individual bridging filaments 40, which may be facilitated by choice of appropriate spacing of the bridging filaments (and also by the absence of any adhesive 15 on bridging filaments 40). In some embodiments, the production and attachment of first-side bridging filaments 40 to fibrous filtration web 8 may be done in-line with the process of pleating fibrous filtration web 8.

In some embodiments, the deposition of adhesive 15, the production and attachment of first-side bridging filaments 40, and the deposition of sorbent particles 14, and may all be done in-line (e.g. in the listed order) in a single continuous production process. If second-side bridging filaments 40' are to be used, they may also be produced and attached in-line in this same process, e.g. before the deposition of adhesive 15. In some embodiments, any or all of these processes may be performed in-line with the process of pleating fibrous filtration web 8. In specific embodiments, the pleating of fibrous filtration web 8, the production and attachment of second-side bridging filaments 40' if desired, the providing (e.g. deposition) of adhesive 15, the production and attachment of first-side bridging filaments 40 if desired, and the deposition of sorbent particles 14, may all be done in-line (e.g. in the listed order), in a single continuous production process.

In some embodiments, the deposition of sorbent particles 14 may be electrostatic deposition, e.g. performed by feeding a conveyor bearing sorbent particles 14, and by feeding pleated fibrous filtration web 8, through an electric field that is arranged to motivate the sorbent particles away from the conveyor (e.g. upward) so that they impinge on adhesive-bearing major surface 25 of fibrous web 8. Such electrostatic deposition apparatus and methods may e.g. be of the general types disclosed in U.S. Provisional Patent Application No. 62/399,618, entitled Nonwoven Abrasive Articles Having Electrostatically-Oriented Abrasive Particles and Methods of Making Same. In particular embodiments in which adhesive 15 (after solidifying e.g. by way of being cooled, crosslinked, or in general by any suitable solidification process) does not exhibit pressure-sensitive properties, the deposition of sorbent particles 14 may be performed in-line with (at least) the adhesive-deposition process, and maybe performed while adhesive 15 has not fully solidified, so that sorbent particles are held in place when adhesive 15 does solidify.

If desired, any sorbent particles 14 that are not securely bonded to major surface 25 by adhesive 15, may be removed e.g. by impingement of moving air, or by any other suitable mechanism. Particularly if first-side bridging filaments are present (which might render it difficult to bring e.g. a brush into contact with first-side pleat walls 23 of pleated web 8 to remove loose sorbent particles therefrom), it may be desirable to use moving air (or any other suitable gas) for such purposes, whether impinged onto major surface 25 of pleated web 8 or passed through pleated web 8 from second side 3 to first major side 2. Any such loose-particle-removal process may be performed in-line with the particle deposition process, an adhesive-deposition process, and so on.

The above-recited arrangements will provide an air filter media 10 comprising a pleated fibrous filtration web 8 bearing at least one sorbent-loaded area 26 comprising at least some sorbent particles 14 that are post-pleat-deposited sorbent particles. In some embodiments, all of the above processes, including sorbent particle deposition, may be performed with pleated fibrous filtration web in a continuous form. In such embodiments, the thus-formed air filter media 10 may then be cut into discrete sections and may be framed with a perimeter frame 12 if desired, to form a framed air filter 1. In some embodiments, any edge areas of fibrous web 8 that will be blocked (occluded) by flanges of a perimeter frame 12 (and that thus may not contribute to the active filtration area of the framed air filter) may be covered during sorbent deposition and/or during adhesive deposition so that adhesive 15 is not deposited in these areas and/or so that sorbent particles 14 are not deposited in these areas.

In contrast to the continuous processing described above, in some embodiments, pleated fibrous filtration web 8, bearing adhesive 15 on major surface 25 thereof and bearing at least first-side bridging filaments 40 if desired, may be cut into discrete sections before sorbent particles 14 are deposited on first major surface 25. That is, certain of the above processes may be carried out, after which fibrous web 8 is separated into discrete pieces. In such embodiments, discrete pieces of pleated fibrous filtration web 8, bearing adhesive 15 on major surface 25 thereof, and optionally bearing first-side bridging filaments 40 (and second-side bridging filaments 40') may be fed into a sorbent particle-deposition process rather than web 8 being fed into such a process as a continuous substrate. In fact, in some embodiments discrete pieces of pleated fibrous filtration web 8 (again, bearing bridging filaments if desired) may have perimeter frames applied thereto before being fed into a sorbent particle-deposition process. Such arrangements can provide that sorbent particles 14 may only be deposited on the area of pleated fibrous filtration web 8 that will be the active filtration area of the resulting air filter. (If desired, the perimeter frame can be blocked e.g. with a stencil during the particle deposition process to minimize the number of sorbent particles that contact the perimeter frame.)

It is emphasized that the above-described arrangements are merely exemplary illustrations and that the apparatus and process steps disclosed herein can be used in any suitable combinations and variations.

Figure 12:
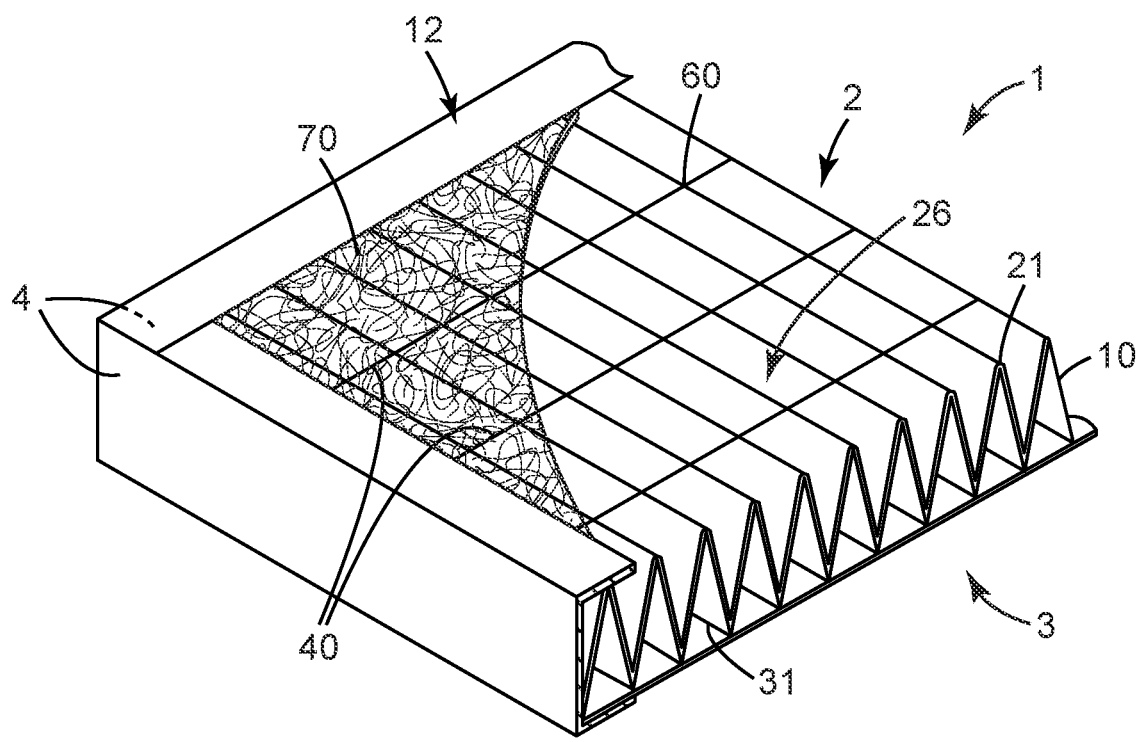
FIG. 12 is a partial cutaway perspective view of an exemplary air filter that includes a cover web.

In some embodiments, a cover web 70 (as shown in exemplary embodiment in partial cutaway in FIG. 12) may be positioned atop (i.e., outward of, along an upstream-downstream direction of air filter media 10) the at least one sorbent-loaded area 26. This can provide that any small number of sorbent particles 14 that might be dislodged from air filter media 10 during handling or use of air filter media 10 may remain contained within air filter 1 rather than e.g. leaving air filter 1 as debris. Such a cover web may take any suitable form; for example it might be a lightweight scrim, netting, mesh or screen that is provided on first major side 2 of pleated fibrous filtration web 8. Such a cover web may exhibit a relatively low pressure drop and may comprise apertures (e.g. as defined by tortuous passages through a nonwoven fibrous web) that are sized to ensure that few if any dislodged sorbent particles are able to pass therethrough. By definition, such a cover web will not be pleated along with fibrous filtration web 8. Such a cover web can be provided on first major side 2 of pleated fibrous filtration web 8 in any desired manner. For example, it may be bonded to at least some pleat tips 21 and/or bonded to at least some bridging filaments 40. In some embodiments it may be bonded to fibrous filtration web 8 only in areas proximate perimeter edges of web 8.

Any such attachment (e.g. bonding) of a cover web to first major side 2 of fibrous filtration web 8 may be done with web 8 still in a continuous form, or it may be done after web 8 has been separated into discrete pieces. In some embodiments, such a cover web may not be bonded to fibrous filtration web 8 at all. Rather, such a cover web may comprise perimeter edges that are attached (e.g. by adhesive bonding, stapling, and so on) to first-side flanges of a perimeter frame. In some embodiments it may not be necessary to attach the cover web to a perimeter frame. For example, a cover web may be placed on first major side 2 of pleated web 8 and a perimeter frame mounted on the perimeter edges of this multilayer stack, with the perimeter frame serving to hold the cover web sandwiched against first major side 2 of pleated web 8. Any suitable configuration is possible as long as the cover web can serve its purpose of minimizing the tendency of any dislodged sorbent particles to escape air filter 1.

Filter Media and Uses

In some embodiments, filter media 10 (e.g. comprising pleated fibrous filtration web 8 with bridging filaments 40 on at least the first major side of pleated web 8) may be self-supporting. By this is meant that the air filter media, in the absence of a perimeter frame, when placed in a conventional perimeter-holding fixture of a forced-air HVAC system is able to withstand the forces developed when air impinges on the upstream face of the air filter media to develop a pressure drop of at least 0.2 inch of water when tested in the manner described in the Examples section of U.S. Pat. No. 9,174,159. By able to withstand such forces means that the pleated structure does not collapse, deform, become dislodged, rupture, or the like, so as to render the performance of the air filter media unsatisfactory. Thus, in some embodiments air filter media 10 may be used without a perimeter frame. Even if unframed air filter media 10 is not self-supporting, it may still be used as an air filter 1, e.g. if mounted on a supporting grid or lattice (e.g. a mesh support of the type often found in so-called mini-split heating and air-conditioning units). In some embodiments, air filter media 10 may be conformable so that it can be conformed to an arcuate mesh support of an air-handling system. In some embodiments, a perimeter frame 12 may be mounted to major edges 4 of air filter media 10 to provide a framed air filter, as shown in exemplary embodiment in FIGS. 1 and 2. In some embodiments, such a perimeter frame may be a so-called channel frame; in other embodiments it may be a so-called pinch frame.

Any air filter 1 relying on air filter media 10 as disclosed herein, whether framed or unframed, may be used in any suitable environment or situation in which moving air, e.g. motivated by a mechanized fan or blower system, is desired to be filtered. Filter 1 thus may find use e.g. in HVAC (heating-ventilating-air-conditioning) systems, room air purifiers, automotive engine or cabin-air filtration applications, and so on. In particular embodiments an air filter 1 may be used in a forced-air heating, cooling, and/or heating/cooling systems of any type used in residences, office buildings, retail establishments, and so on. Such air-handling systems may be centralized systems in which air from multiple rooms is processed by a centralized heating or cooling unit; or, they may be so-called mini-split systems in which air from e.g. only a single room is processed.

Filter 1 may also find use in any kind of respiratory-protection apparatus, e.g. in a personal respiratory protection device. For example, filter 1 may be positioned within a filter cartridge that can be fluidly coupled to a mask body to provide a personal respiratory protection device; or filter 1 may be part of a filtering face-piece respirator mask (whether e.g. a molded mask or a flat-fold mask). Any such personal respiratory protection device with which filter 1 is used may be e.g. a so-called "negative-pressure" respirator in which the motive power for moving air is the breathing of a user rather than a separately provided motorized fan. Such negative-pressure respirators are often configured as e.g. full-face respirators, half-face respirators, and hoods (e.g., escape hoods, smoke hoods, and the like). In other embodiments, filter 1 may be used in a personal respiratory protection device in which the motive power for moving air is a motorized fan or blower. Such products may include e.g. a PAPR (powered air purifying respirator). In such products, air filter 1 may be located proximate the user's face or head; or, it may be located remotely (e.g., positioned in a receptacle of a belt-worn housing).

Regardless of the particular use, it will be appreciated that the arrangements disclosed herein can provide an air filter 1 comprising air filter media 10 that includes a pleated (e.g., a tightly-pleated) fibrous filtration web (e.g. an electret web) 8 with a layer of sorbent particles 14 (e.g. activated carbon) on a major surface thereof. At least some such arrangements can provide that a relatively high loading of sorbent particles can be used, without significantly increasing the pressure drop that is required in order to pass air through the filter media. This can provide a combination of high filtration efficiency (e.g. of fine particles), low pressure drop, and removal of gaseous or vaporous materials (e.g. removal of odors), which will be useful in many applications. In particular embodiments, the arrangements disclosed herein allow the use high-speed pleating processes such as e.g. rotary-score pleating without disadvantageously causing crushing of sorbent particles in the scoring process.

In use of air filter 1, flowing air enters an upstream valley and passes into upstream pleat walls so as to penetrate into fibrous filtration web 8. The flowing air then passes out of downstream pleat walls so as to exit fibrous filtration web 8. In some embodiments, air filter 1 may be configured to be installed in an airstream so that the first major side 2 of fibrous filtration web 8, which side includes the at least one sorbent-loaded area 26, is a downstream side of the air filter media. Such a configuration may provide that the majority of airborne fine particles will be filtered by fibrous filtration web 8 before reaching sorbent particles 14, thus minimizing any chance of the sorbent particles being occluded or otherwise blocked by the fine particles. In such embodiments, air filter 1 may comprise indicia (e.g. arrow 5 of FIG. 1 indicating the direction of airflow through the filter) indicating that air filter 1 is to be installed in an air-handling system in an orientation such that first major side 2 of fibrous filtration web 8 is a downstream side of the air filter media. In other embodiments, air filter 1 may be configured to be installed so that the first major side 2 of fibrous filtration web 8 is an upstream side of the air filter media, with a corresponding indicia to provide such indication.

List of Exemplary Embodiments

Embodiment 1 is an air filter media comprising: a pleated fibrous filtration web with a first major side that includes at least one sorbent-loaded area in which sorbent particles are present on a first major surface of the pleated fibrous filtration web at a loading of at least about 20 grams per square meter, wherein at least some of the sorbent particles are post-pleat-deposited sorbent particles.

Embodiment 2 is the air filter media of embodiment 1 wherein the air filter media exhibits one or more structural characteristics that indicate that at least some of the sorbent particles were deposited on the first major surface of the fibrous filtration web to form the at least one sorbent-loaded area, subsequent to the fibrous filtration web being folded into a pleated configuration.

Embodiment 3 is the air filter media of embodiment 2 wherein the one or more structural characteristics includes the condition that the at least one sorbent-loaded area comprises at least some first-side pleat valley floors that each exhibit a local loading of sorbent particles that is below 50 percent of a local loading of sorbent particles on a pleat wall that flanks the pleat valley floor.

Embodiment 4 is the air filter media of any of embodiments 1-3 wherein the pleated fibrous filtration web is a scored pleated fibrous filtration web that exhibits at least some identifiable score lines that coincide with pleat tips and pleat valleys of the first major side of the pleated fibrous filtration web, and wherein the air filter media exhibits one or more structural characteristics that indicate that at least some of the sorbent particles were deposited on the first major surface of the web to form the at least one sorbent-loaded area, subsequent to the fibrous filtration web being scored.

Embodiment 5 is the air filter media of any of embodiments 1-4 wherein a plurality of bridging filaments are disposed on the first major side of the pleated fibrous filtration web, the bridging filaments extending in a direction that is at least generally perpendicular to a pleat direction of the pleated fibrous filtration web and at least some of the bridging filaments being bonded to at least some pleat tips of the first major side of the pleated fibrous filtration web; and wherein the air filter media exhibits one or more structural characteristics that indicate that at least some of the sorbent particles were deposited on the first major surface of the pleated fibrous filtration web to form the at least one sorbent-loaded area, subsequent to the bridging filaments being disposed on the first major side of the pleated fibrous filtration web and being bonded to at least some pleat tips of the first major side of the pleated fibrous filtration web.

Embodiment 6 is the air filter media of any of embodiments 1-5 wherein in the at least one sorbent-loaded area of the first major side of the pleated fibrous filtration web, a discontinuous adhesive layer is present on the first major surface of the pleated fibrous filtration web so that the sorbent particles are adhesively bonded to the first major surface of the pleated fibrous filtration web. Embodiment 7 is the air filter media of embodiment 6 wherein the air filter media exhibits one or more structural characteristics that indicate that at least some adhesive material was deposited on the first major surface of the pleated fibrous filtration web to form the discontinuous adhesive layer, subsequent to the fibrous filtration web being folded into a pleated configuration.

Embodiment 8 is the air filter media of embodiment 7 wherein the air filter media exhibits one or more structural characteristics that indicate that the following process steps were carried out, in order: scoring the fibrous filtration web; folding the scored fibrous filtration web into a pleated configuration; depositing adhesive material on the first major surface of the pleated fibrous filtration web to form a discontinuous adhesive layer; disposing a plurality of bridging filaments on the first major side of the pleated fibrous filtration web and bonding the bridging filaments to at least some pleat tips of the first major side of the pleated fibrous filtration web; and, depositing sorbent particles on at least a portion of the first major surface of the first major side of the pleated fibrous web to provide at least one sorbent-loaded area comprising post-pleat-deposited sorbent particles.

Embodiment 9 is the air filter media of any of embodiments 6-8 wherein the discontinuous adhesive layer comprises an adhesive that is a pressure-sensitive adhesive. Embodiment 10 is the air filter media of any of embodiments 5-9 wherein at some of the bridging filaments are melt-extruded filaments that are melt-bonded to at least some pleat tips of the first major side of the pleated fibrous filtration web. Embodiment 11 is the air filter media of any of embodiments 1-10 wherein a plurality of bridging filaments is disposed on a second major side of the pleated fibrous filtration web that is opposite the first major side, the bridging filaments extending in a direction that is at least generally perpendicular to the pleat direction of the pleated fibrous filtration web and at least some of the bridging filaments being bonded to at least some pleat tips of the second major side of the pleated fibrous filtration web. Embodiment 12 is the air filter media of any of embodiments 1-11 wherein the pleated fibrous filtration web exhibits a pleat spacing of less than about 10 mm, a pleat height of at least about 10 mm, and a pleat fold radius of curvature of less than about 2 mm. Embodiment 13 is the air filter media of any of embodiments 1-12 wherein the sorbent particles include at least some activated carbon particles. Embodiment 14 is the air filter media of any of embodiments 1-13 wherein in the at least one sorbent-loaded area of the first major side of the pleated fibrous filtration web, the sorbent particles are present on the first major surface of the pleated fibrous filtration web at least substantially as a monolayer of particles present at an area coverage of at least about 70%. Embodiment 15 is the air filter media of any of embodiments 1-14 wherein in the at least one sorbent-loaded area of the first major side of the pleated fibrous filtration web, the sorbent particles are present on the first major surface of the pleated fibrous filtration web as a layer that exhibits an average thickness that is at least about 50% of an average thickness of the pleated fibrous filtration web.

Embodiment 16 is the air filter media of any of embodiments 1-15 wherein the pleated fibrous filtration web comprises at least some fibers that comprise charged electret moities and wherein the pleated fibrous filtration web exhibits a Percent Penetration of less than 90. Embodiment 17 is the air filter media of any of embodiments 1-16 further comprising a cover web that is disposed on a first major side of the air filter media. Embodiment 18 is an air filter comprising the air filter media of any of embodiments 1-17 with a perimeter frame mounted to a perimeter of the air filter media, so that the air filter is a framed air filter. Embodiment 19 is the air filter of embodiment 18 wherein the air filter comprises indicia indicating that the air filter is to be installed in an air-handling system in an orientation such that the first major side of the fibrous filtration web, that includes the at least one sorbent-loaded area, is a downstream side of the air filter media.

Embodiment 21 is a method of forming an air filter media, the method comprising: depositing sorbent particles on at least a portion of a first major surface of a pleated fibrous filtration web to form at least one sorbent-loaded area of the pleated fibrous filtration web.

Embodiment 22 is the method of embodiment 21 wherein the method includes a step of scoring a fibrous filtration web and folding the fibrous filtration web to form the pleated fibrous filtration web, prior to depositing the sorbent particles on the first major surface of the pleated fibrous filtration web to form the at least one sorbent-loaded area. Embodiment 23 is the method of any of embodiments 21-22, wherein the first major surface of the pleated fibrous filtration web comprises a discontinuous layer of adhesive, and wherein the method includes a step of adhesively bonding the deposited sorbent particles to the first major surface of the pleated fibrous filtration web to form the at least one sorbent-loaded area. Embodiment 24 is the method of embodiment 23, wherein the method includes a step of folding a fibrous filtration web to form the pleated fibrous filtration web, followed by a step of depositing adhesive on the first major surface of the pleated fibrous filtration web to form the discontinuous layer of adhesive. Embodiment 25 is the method of any of embodiments 21-24, wherein the method includes a step of disposing a plurality of bridging filaments on a first major side of the pleated fibrous filtration web and bonding at least some of the bridging filaments to at least some pleat tips of the first major side of the pleated fibrous filtration web, which step is followed by the step of depositing sorbent particles on the first major surface of a pleated fibrous filtration web to form the least one sorbent-loaded area of the pleated fibrous filtration web. Embodiment 26 is the method of embodiment 25 wherein at least some of the sorbent particles pass through spaces between bridging filaments of the plurality of bridging filaments in the process of being deposited on the first major surface of the pleated fibrous filtration web. Embodiment 27 is the method of any of embodiments 24-26 wherein the method includes a step of folding a fibrous filtration web to form the pleated fibrous filtration web, followed by a step of depositing adhesive on the first major surface of the pleated fibrous filtration web to form the discontinuous layer of adhesive, with both steps preceding a step of disposing the plurality of bridging filaments on the first major side of the pleated fibrous filtration web and bonding at least some of the bridging filaments to at least some pleat tips of the first major side of the pleated fibrous filtration web. Embodiment 28 is the method of embodiment 27 wherein the method includes a step of scoring the fibrous filtration web prior to folding the fibrous filtration web to form the pleated fibrous filtration web.

Embodiment 29 is the method of any of embodiments 21-28 wherein the method includes a step of disposing a plurality of bridging filaments on a second major side of the pleated fibrous filtration web and bonding at least some of the bridging filaments to at least some pleat tips of the second major side of the pleated fibrous filtration web, and a step of disposing a plurality of bridging filaments on a first major side of the pleated fibrous filtration web and bonding at least some of the bridging filaments to at least some pleat tips of the first major side of the pleated fibrous filtration web, with both of these steps preceding the step of depositing sorbent particles on the first major surface of a pleated fibrous filtration web to form the least one sorbent-loaded area of the pleated fibrous filtration web.

Embodiment 30 is the method of embodiment 29 wherein the method includes a step of folding a fibrous filtration web to form the pleated fibrous filtration web, holding the pleated fibrous filtration web in its pleated formation by a holding fixture of a pleating apparatus, and disposing the plurality of bridging filaments on the second major side of the pleated fibrous filtration web and bonding at least some of the bridging filaments to at least some pleat tips of the second major side of the pleated fibrous filtration web to stabilize the pleated configuration of the pleated fibrous filtration web, after which the pleated fibrous filtration web is removed from the holding fixture of the pleating apparatus.

Embodiment 31 is the method of embodiment 21, the method comprising the steps of, in order: scoring a fibrous filtration web to provide score lines; folding the scored fibrous filtration web along at least some of the score lines to form the pleated fibrous filtration web; depositing adhesive material on the first major surface of a first major side of the pleated fibrous filtration web to form a discontinuous adhesive layer; disposing a plurality of bridging filaments on the first major side of the pleated fibrous filtration web and bonding the bridging filaments to at least some pleat tips of the first major side of the pleated fibrous filtration web; and, depositing sorbent particles on at least a portion of the first major surface of the first major side of the pleated fibrous web and adhesively bonding the sorbent particles to the first major surface of the first major side of the pleated fibrous web, to provide the at least one sorbent-loaded area comprising post-pleat-deposited sorbent particles.

Embodiment 32 is the method of any of embodiments 21-31 wherein the sorbent particles are deposited on at least a portion of a first major surface of a pleated fibrous filtration web to form at least one sorbent-loaded area of the pleated fibrous filtration web, by electrostatic deposition.

EXAMPLES

Test Methods
% Penetration, Filtration Efficiency, Pressure Drop, and Quality Factor Percent penetration, filtration efficiency, pressure drop and the filtration Quality Factor (QF) of a web sample is determined using a challenge aerosol containing NaCl (sodium chloride) particles, delivered at a flow rate of approximately 85 liters/min to provide a face velocity of 14 cm/s, and evaluated using a TSI™ Model 8130 high-speed automated filter tester (commercially available from TSI Inc.). For NaCl testing, the aerosol may contain particles with a diameter of approximately 0.26 μm mass mean diameter, and the Automated Filter Tester may be operated with the heater on and the particle neutralizer on. Calibrated photometers may be employed at the filter inlet and outlet to measure the particle concentration and the % particle penetration through the filter. Filtration efficiency can be calculated as 100 minus the % particle penetration (and is reported in percent). An MKS pressure transducer (commercially available from MKS Instruments) may be employed to measure pressure drop (ΔP, mm H2O or inches wc (water column)) through the filter. The equation:

$$QF = \frac{-\ln\left(\frac{\% \text{ Particle Penetraton}}{100}\right)}{\Delta P}$$

maybe used to calculate QF. Units of QF are inverse pressure drop (reported in mm $H_2O$ or inches wc). Initial (fine) particle removal filtration efficiency (E1) and related parameters can be obtained using methods and apparatus described in U.S. Pat. No. 9,539,532 to Fox.

Toluene Removal Efficiency

A toluene removal efficiency test may be performed on samples of filter media, against a challenge of 40 parts per million (by volume) toluene at 50% relative humidity and a 156 LPM air flow (0.50 m/s face velocity). Toluene vapor may be generated by heating a liquid toluene solution in a 50% humid air stream. Toluene concentration can be measured using a photoacoustic detector from California Analytical Instruments. Filter toluene efficiency can be calculated from the toluene concentration (C) in the flowing airstream upstream and downstream of the filter media sample, by the following relationship: % Efficiency=100* (1−$C_{downstream}$ (filter in use)/$C_{downstream}$ (filter not in use)). Often, the efficiency may decline gradually over a testing period (e.g. as the sorbent captures additional toluene); for a standard reference point, the toluene removal efficiency after a specific time (five minutes, in the present Examples)

of toluene exposure may be used. For the purposes of such testing, a filter media sample of any convenient size may be used, as long as the ratio of sorbent-loaded area to sorbent-free area of the particular sample tested is representative of that of the filter media as it is used in a filter. Airflow resistance (pressure drop) may also be obtained in such testing. A toluene-removal quality factor may be obtained, which is calculated in analogous manner to the above-presented particulate-filtration quality factor, except that % toluene efficiency is measured and used, rather than % particle penetration.

Working Examples, Reference Examples and Comparative Examples

Working Example W-1

A commercially available framed air filter was obtained. The filter was a 20"×25"×1" (nominal) size FILTRETE Healthy Living mini-pleat type air filter, having a 1500 MPR (Microparticle Performance Rating), available from 3M Company, St. Paul, Minn. The pleated fibrous filtration web of this air filter is made from a polypropylene spunbond nonwoven material, having a basis weight of approximately 65 g/m2, and having a pleat height of approximately 0.75 inches (1.9 cm) and a pleat spacing of approximately 3.5 pleats per inch (1.4 pleats per cm). For these Working Example prototypes, the filter frame and the wire mesh reinforcing layers that were present on both sides of the air filter as obtained, were not removed before spray coating the adhesive.

One side of the pleated fibrous filtration web of the framed air filter was spray coated with an aqueous acrylate copolymer emulsion adhesive (ACRONAL A 220, BASF Corporation) using a compressed air spray gun. The wet adhesive coating weight was estimated to be in the range of approximately 1-5 grams per filter. A parallel-plate electrostatic apparatus was then used to deposit sorbent (activated carbon) as follows. The adhesive-coated pleated filtration web was suspended between an upper plate that was connected to a high voltage generator (Glassman High Voltage, Series FR), and a lower, ground plate. The upper surface of the pleated filtration web (e.g. the uppermost pleat tips) was held very close to (e.g., within less than ~2 mm of) the upper plate with the lower surface of the pleated filtration web being approximately 1⅜ to 1½ inches above the ground plate. The adhesive-coated surface of the pleated filtration web faced downward toward the ground plate, with the pleated web held so that the overall major plane of the pleated web was approximately parallel to the plates.

A layer of 20×40 mesh activated carbon particles (Kowa Company) was then placed onto the copper ground plate. The high voltage generator was used to charge the upper plate to a negative polarity with a voltage of approximately 13 kV. This resulted in the upward movement of the activated carbon particles and uniform deposition of the activated carbon particles onto the adhesive-bearing surface of the fibrous filtration web. The coating weight of the activated carbon particles was estimated to be approximately 189 grams per filter.

Working Example W-2

Working Example W-2 was prepared as described for Example 1 except that 32×60 mesh activated carbon particles (Kuraray Chemical Company) were used. The coating weight of the activated carbon particles was approximately 149 grams per filter.

Working Example W-3

The pleated fibrous filtration web of a commercially available air filter was removed from its filter frame. The air filter used was the same model as that used in Working Examples W-1 and W-2. After removing the wire mesh reinforcing layer from one side of the fibrous filtration web, that side of the fibrous web was spray coated with an aqueous acrylate copolymer emulsion adhesive (ACRONAL A 220, BASF Corporation) using a compressed air spray gun. The wet adhesive coating weight was believed to be in a similar range to that of Working Examples W-1 and W-2. Bridging polypropylene filaments were then extruded as a molten stream and extrusion-bonded to the pleat tips of the fibrous web to function as a support structure that constrains the pleat spacing. The extrusion of the bridging filaments was performed in generally similar manner to the procedures described in U.S. Pat. No. 9,174,159, which is incorporated by reference herein. Activated carbon was then electrostatically deposited onto the adhesive bearing surface of the pleated fibrous filtration web in similar manner as described in Working Example W-2. The coating weight of the activated carbon particles was believed to be in a similar range to that of Working Example W-2. Following the deposition of the activated carbon, the wire mesh reinforcing layer was removed from the side of the fibrous web opposite the side of the carbon loaded side and a second support structure of bridging polypropylene filaments was similarly applied to the pleat tips of this uncoated side of the fibrous filtration web.

Working Example W-4

To demonstrate that a hot melt adhesive can be used to bond sorbent particles to the surface of a fibrous filtration web and that a continuous conveyor (rather than a batch process) can be used to electrostatically deposit sorbent particles onto the web, a 14 inch wide roll of polypropylene spunbond web (65 g/m$^2$ basis weight) was obtained. The web was unwound and then passed under a 12 inch wide ITW spray applicator head configured with a randomized fiber head (ITW Dynatec), which sprayed continuous strands of hot-melt adhesive (BOSTIK THERMOGRIP H2345) down onto the surface of the spunbond web in such manner that the adhesive coating covered the entire nominal surface of the web (although forming a discontinuous adhesive layer as described earlier herein). The web was then flipped over so that the adhesive-bearing surface of the web was facing down. Activated carbon was electrostatically deposited onto the adhesive bearing surface of the web in a manner similar to that described for Working Examples W-1 and W-2 except that a grounded conveyor was positioned underneath the web to feed the activated carbon particles instead of a grounded copper plate. The carbon particles used were 20×40 mesh activated carbon particles (Kowa Company). The line speed was between 20-50 feet per minute, which resulted in an adhesive coating weight estimated to be in the range of approximately 5-30 g/m$^2$ and a coating weight of activated carbon estimated to be approximately 180 g/m$^2$.

Reference Example R-1

Reference Example R-1 was the same commercially available air filter used as a starting material in the Working Examples, and was not coated with activated carbon particles.

Working Examples W-1 and W-2 and Reference Example R-1 were tested against a toluene challenge with 40 ppm concentration at a face velocity of 0.5 m/s and 50% RH. Test results are shown in Table 1. Working Examples W-1 and W-2 and Reference Example R-1 were also subjected to the ASHRAE 52.2 test method at a velocity of 1.5 m/s to a final resistance of 0.50" inches wc. The W-1 and W-2 example filters were tested with the carbon coated side of the filter downstream. Pressure drop and E1, E2, E3 efficiency are reported in Table 2.

TABLE 1

| Units | Pressure Drop at 1.5 m/s inches wc | Pressure Drop due to Carbon* at 1.5 m/s inches wc | Toluene Efficiency at 0.5 m/s (5 min) % | Toluene Quality Factor** (inches wc)$^{-1}$ |
|---|---|---|---|---|
| W-1 | 0.271 | 0.046 | 70 | 26.17 |
| W-2 | 0.267 | 0.042 | 78 | 36.05 |
| R-1 | 0.225 | — | — | — |

*Pressure drop values due to carbon for W-1 and W-2 were calculated by subtracting the pressure drop measured at 1.5 m/s for R-1 from the pressure drop measured at 1.5 m/s for W-1 and W-2
**Toluene QF was calculated based on efficiency at 0.5 m/s and pressure drop (due to carbon) at 1.5 m/s using the equation: QF = −ln (1 − % Efficiency)/ΔP

TABLE 2

| Measurement | Units | W-1 | W-2 | R-1 |
|---|---|---|---|---|
| Pressure Drop | Inches wc | 0.271 | 0.267 | 0.225 |
| Initial E1 Efficiency (0.3-1.0 μm) | % | 56.0 | 56.8 | 64.1 |
| Initial E2 Efficiency (1.0-3.0 μm) | % | 82.3 | 83.1 | 87.0 |
| Initial E3 Efficiency (3.0-10.0 μm) | % | 92.0 | 92.4 | 93.4 |
| Composite E1 Efficiency (0.3-1.0 μm) | % | 56.0 | 56.8 | 64.1 |
| Composite E2 Efficiency (1.0-3.0 μm) | % | 82.3 | 83.1 | 87.0 |
| Composite E3 Efficiency (3.0-10.0 μm) | % | 92.0 | 92.4 | 93.4 |

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. A method of forming an air filter media, the method comprising:
    folding a fibrous filtration web to form a pleated fibrous filtration web with a first major side comprising a first major surface,
    then,
    depositing adhesive on the first major surface of the pleated fibrous filtration web to form a discontinuous layer of adhesive
    then,
    extruding a plurality of bridging filaments onto the first major side of the pleated fibrous filtration web and extrusion-bonding at least some of the bridging filaments to at least some pleat tips of the first major side of the pleated fibrous filtration web,
    then,
    depositing sorbent particles on the first major surface of the pleated fibrous filtration web so that the sorbent particles are adhesively bonded to the first major surface of the pleated fibrous filtration web by the discontinuous layer of adhesive to form a sorbent-loaded area that occupies at least substantially all of an active filtration area of the pleated fibrous filtration web.

2. The method of claim 1 wherein the method includes a step of scoring the fibrous filtration web before folding the fibrous filtration web to form the pleated fibrous filtration web.

3. The method of claim 1 wherein at least some of the sorbent particles pass through spaces between bridging filaments of the plurality of bridging filaments in the process of being deposited on the first major surface of the pleated fibrous filtration web.

4. The method of claim 1 wherein the method includes a step of scoring the fibrous filtration web prior to folding the fibrous filtration web to form the pleated fibrous filtration web.

5. The method of claim 1 wherein the method includes a step of extruding a plurality of bridging filaments on a second major side of the pleated fibrous filtration web and extrusion-bonding at least some of the bridging filaments to at least some pleat tips of the second major side of the pleated fibrous filtration web, in addition to the step of extruding the plurality of bridging filaments on a first major side of the pleated fibrous filtration web and extrusion-bonding at least some of the bridging filaments to at least some pleat tips of the first major side of the pleated fibrous filtration web, with both of these steps preceding the step of depositing sorbent particles on the first major surface of a pleated fibrous filtration web to form the sorbent-loaded area of the pleated fibrous filtration web.

6. The method of claim 5 wherein the method includes a step of folding a fibrous filtration web to form the pleated fibrous filtration web, holding the pleated fibrous filtration web in its pleated formation by a holding fixture of a pleating apparatus, and extruding the plurality of bridging filaments on the second major side of the pleated fibrous filtration web and extrusion-bonding at least some of the bridging filaments to at least some pleat tips of the second major side of the pleated fibrous filtration web to stabilize the pleated configuration of the pleated fibrous filtration web, after which the pleated fibrous filtration web is removed from the holding fixture of the pleating apparatus.

7. The method of claim 1 wherein the sorbent particles are deposited on the first major surface of the pleated fibrous filtration web to form the sorbent-loaded area of the pleated fibrous filtration web, by electrostatic deposition.

8. The method of claim 1 wherein the sorbent particles are present in the sorbent-loaded area of the first major surface of the pleated fibrous filtration web at a loading of at least 20 grams per square meter.

9. The method of claim 1 wherein the sorbent-loaded area comprises at least some pleat valley floors that each exhibit a local loading of sorbent particles that is below 50 percent of a local loading of sorbent particles on a pleat wall that flanks the pleat valley floor.

10. The method of claim 1 wherein in the sorbent-loaded area of the first major surface of the pleated fibrous filtration web, the sorbent particles are present on the first major surface of the pleated fibrous filtration web as a layer that exhibits an average thickness that is at least about 50% of an average thickness of the pleated fibrous filtration web.

11. The method of claim 1 wherein the pleated fibrous filtration web exhibits a pleat spacing of less than 10 mm, a pleat height of at least about 10 mm, and a pleat fold radius of curvature of less than 2 mm.

12. The method of claim 1 further comprising mounting a perimeter frame to a perimeter of the air filter media comprising the sorbent-loaded area to form a framed air filter.

\* \* \* \* \*